(12) United States Patent
Hanafusa et al.

(10) Patent No.: US 6,844,105 B1
(45) Date of Patent: Jan. 18, 2005

(54) PLATE SHAPED BATTERY PACK AND PORTABLE RADIO TERMINAL

(75) Inventors: Kiyoshi Hanafusa, Hyogo (JP); Hiroichi Ishida, Hyogo (JP)

(73) Assignee: Mitsubishi Denki Kabushiki Kaisha (JP)

( * ) Notice: Subject to any disclaimer, the term of this patent is extended or adjusted under 35 U.S.C. 154(b) by 0 days.

(21) Appl. No.: 09/913,349

(22) PCT Filed: Dec. 17, 1999

(86) PCT No.: PCT/JP00/07132
§ 371 (c)(1),
(2), (4) Date: Aug. 14, 2001

(87) PCT Pub. No.: WO01/45184
PCT Pub. Date: Jun. 21, 2001

(51) Int. Cl.[7] .......................... H01M 2/10; H01M 2/30; H01M 10/48
(52) U.S. Cl. .......................... 429/62; 429/162; 429/176; 429/177; 429/178
(58) Field of Search ................................ 429/162, 176, 429/177, 178, 62

(56) References Cited

U.S. PATENT DOCUMENTS

| | | |
|---|---|---|
| 4,904,549 A | 2/1990 | Goodwin et al. |
| 6,358,644 B1 * | 3/2002 | Shibata et al. ............... 429/162 |
| 6,451,474 B1 * | 9/2002 | Kozu et al. ............. 429/176 X |

FOREIGN PATENT DOCUMENTS

| | | |
|---|---|---|
| JP | 63-171964 U | 11/1988 |
| JP | 2-98463 U | 8/1990 |
| JP | 02274128 A | 11/1990 |
| JP | 7-41966 U | 7/1995 |
| JP | 10327540 A | 12/1998 |
| JP | 11096983 A | 4/1999 |
| JP | 11111250 A | 4/1999 |

\* cited by examiner

*Primary Examiner*—John S. Maples
(74) *Attorney, Agent, or Firm*—Rothwell, Figg, Ernst & Manbeck, PC

(57) ABSTRACT

A plate shaped battery pack includes: a power generating element (21) sealed by a wrapping member (22) formed in the shape of a wrapper constructed of a laminated film; an anode terminal (24a, 26, 39) and a cathode terminal (23a, 23c, 25, 35) connected to the power generating element (21) and extending from almost a middle portion thereof; and an exterior member (10, 50, 80). The exterior member has a support member (15, 17, 55, 85) in a protruding shape supporting the anode terminal or the cathode terminal, or a recess (72, 76, 83) receiving a seal portion (22d) of the wrapping member. Furthermore, the plate shaped pack has a construction in which the exterior member is electrically conductive and surrounds the wrapping member, and one of the anode terminal and the cathode terminal are electrically connected to thereto, or another construction including, in addition, a temperature detector connected to a heat transfer member.

6 Claims, 17 Drawing Sheets

FIG.30
PRIOR ART
FIG.31
PRIOR ART
FIG.32
PRIOR ART
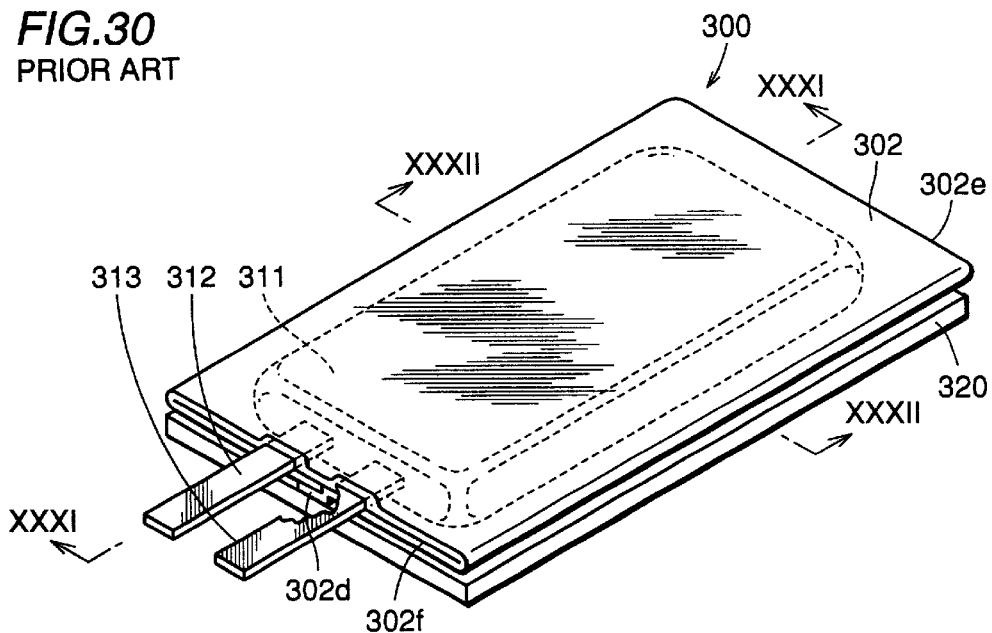
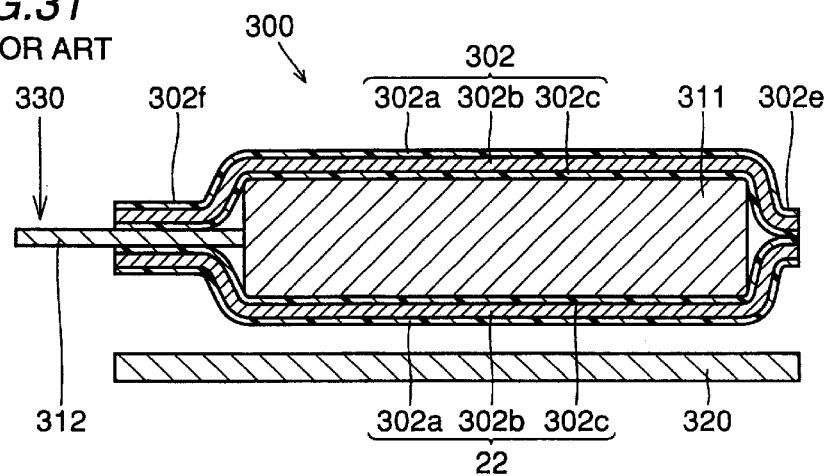
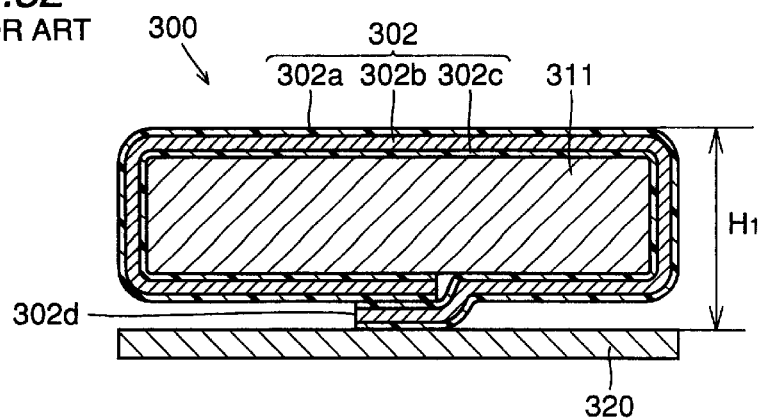

PLATE SHAPED BATTERY PACK AND PORTABLE RADIO TERMINAL

FIELD OF THE INVENTION

The present invention relates to a plate shaped battery and a portable radio terminal, and particularly, to a plate shaped battery used in a portable radio terminal such as a portable telephone, a note book PC or the like and a portable radio terminal using the plate shaped battery.

BACKGROUND ART

Along with the widely spread use of a portable radio terminal such as a portable telephone, a note book PC or the like in recent years, studies have been progressed on a plate shaped battery for use in the portable radio terminal.

FIG. 30 is a perspective view of a prior art plate shaped battery. Referring to FIG. 30, when a plate shaped battery 300 is mounted in a portable radio terminal, the plate shaped battery 300 is placed on a support plate 320. The plate shaped battery 300 is constructed of: a battery core 311; an anode terminal 312; and a cathode terminal 313. A laminated film 302 wraps the battery core 311. The battery core 311 is electrically connected to the anode terminal 312 and the cathode terminal 313.

The battery core 311 is formed by winding a prescribed laminate in turns laying one on top of the preceding one. The laminate includes a thin plate connected to the anode terminal 312, a thin plate connected to the cathode terminal 313 and a separator interposing therebetween, wherein a space between the thin plates is filled with an electrolyte.

The laminated film 302 is provided so as to cover a part of the anode terminal 312 and a part of the cathode terminal 313. By contact bonding parts of the laminated film 302 therebetween, formed are an electrode seal portion 302f, and seal portions 302d and 302e. The laminated film 302 has a three-layer structure composed of a resin layer, an aluminum foil and a resin layer in this order.

In the electrode seal portion 302f, the anode terminal 312 and the cathode terminal 313 are sealed being sandwiched by parts of the laminated film 302. The electrode seal portion 302f is formed so as to extend in one direction. The seal portion 302d is formed so as to extend in a direction almost perpendicular to the one direction of the electrode seal portion 302f. The seal portion 302d is formed so as to extend along the battery core 311. The seal portion 302d is in contact with the support plate 320. The seal portion 302e is formed so as to extend almost in parallel to the one direction along which the electrode seal portion 302f. With the electrode seal portion 302f, and the seal portions 302d and 302e, the electrolyte inside of the battery core 311 can be prevented from leaking outside thereof.

Parts of the anode terminal 312 and the cathode terminal 313, not covered by the laminated film 302 are electrically connected to a circuit board of a portable telephone, a note book PC or the like.

FIG. 31 is a sectional view taken on line XXXI—XXXI of FIG. 30. Referring to FIG. 31, the plate shaped battery 300 is placed on the support plate 320. The support plate 320 and the plate shaped battery 300 are in contact with each other at the seal portion 302d. Since the seal portion 302d is not shown in the sectional view shown in FIG. 31, the plate shaped battery 300 are depicted as if it floated in the air above the support plate 320 with a gap therebetween. The laminated film 302 is constructed of: resin layers 302a and 302c, and an aluminum foil 302b. The anode terminal 312 protrudes from the electrode seal portion 302f. To the anode electrode 312, a contact pin is put into contact in order to supply power to a portable telephone from the plate shaped battery 300. Thereby, a force is imposed on the anode terminal 312 from a direction shown by an arrow 330.

FIG. 32 is a sectional view taken on line XXXII—XXXII of FIG. 30. Referring to FIG. 32, the plate shaped battery 300 is placed on the support plate 320. The laminated film 302 wraps the battery core 311. The seal portion 302d of the plate shaped battery 300 is in direct contact with the support plate 320. Since in the seal portion 302d, the laminated film 302 has a two layer structure of one on the other, a combined thickness thereof is thicker than that of the laminated film 302 in the other parts. As a result, only the seal portion 302d is in contact with the support plate 320 and the other parts are not in direct contact with the support plate 320. A height $H_1$ of a top surface of the plate shaped battery 311 above the support plate 320 is $H_1$=0.5 to 0.6 mm.

In recent years, the plate shaped battery for use in portable telephone has been developed toward a smaller size and a lighter weight owing to downsizing and saving more of weight on the side of the portable telephone. Hence, as a substance of the anode terminal 312 and the cathode terminal 313, a light aluminum alloy has been adopted and moreover, a thickness thereof has been reduced. Consequently, as shown in FIG. 31, when a force is exerted on the anode terminal 312 from the direction shown by the arrow 330, the anode terminal 312 is bent. Once the anode terminal 312 is bent, the anode terminal 312 comes to has difficulty in connecting to other terminals such as a contact pin, which has led to a problem since loose contact arises therebetween.

Furthermore, as shown in FIG. 32, since the laminated film 302 and the support plate 320 are only in contact with each other at the seal portion 302d, another problem has arisen since not only does positioning of the laminated film 302 become unstable, but a size (or a thickness) of the plate shaped battery 300 grows larger.

In light of the problems, the present invention has been made in order to solve them. It is accordingly, an object of the present invention is to provide a plate shaped battery and a portable radio terminal capable of surly positioning an electrode terminal in place, by or in which no loose contact of the electrode terminal arises.

It is another object of the present invention is to provide a plate shaped battery and a portable radio terminal capable of not only surly positioning a wrapping member in place but also downsizing themselves.

DISCLOSURE OF THE INVENTION

A plate-battery according to one aspect of the present invention includes: an anode terminal and a cathode terminal; a wrapping member; and a support member. The anode terminal and the cathode terminal are connected to a power generating element generating power and extend from almost a middle portion of the power generating element to the outside thereof. The wrapping member seals the power generating element and is formed in the shape of a wrapper. The support member supports the anode terminal or the cathode terminal extending outward from the power generating element.

Since in a plate shaped battery constructed in such a way, provided is the support member supporting the anode terminal or the cathode terminal, the anode terminal or the cathode terminal can be surely positioned. Therefore, the anode terminal or the cathode terminal are not bent even when a force from a contact pin is exerted on the anode terminal or the cathode terminal. As a result, no chance arises to cause loose contact with the contact pin, whereby a high reliability plate shaped battery can be provided.

Moreover, preferably, the support member includes a temperature detector and the plate shaped battery includes a heat transfer member connecting the wrapping member and the temperature detector therebetween in order to transfer heat from the power generating element to the temperature detector. In this case, since the temperature detector also serves as the support member, the support member can be formed without increasing a component.

Furthermore, the support member is formed on a surface of an exterior member in one body therewith. In this case, the exterior member serves as the support member, whereby the support member can be formed without increasing a component.

Besides, preferably, the plate shaped battery further includes: a conductive exterior member surrounding the wrapping member. Since in this case, the exterior member is conductive, the exterior member electromagnetically shields the power generating element. As a result, no influence is exerted on a high frequency current flowing in a portable radio terminal and in addition to this, a high reliability plate shaped battery can be provided.

Moreover, preferably, the exterior member is electrically connected to one of the anode terminal and the cathode terminal. In this case, a potential of the exterior member is the same as that of one of the anode terminal or the cathode terminal and shows a constant value. As a result, an electromagnetic shield effect of the exterior member is further improved, whereby a higher reliability plate shaped battery can be provided.

A portable radio terminal according to the one aspect of the present invention uses a plate shaped battery as described above. In this case, since used is a plate shaped battery in which the anode terminal or the cathode terminal is surly positioned, no chance arises of loose contact between the plate shaped battery and a circuit board, whereby a high reliability portable radio terminal can be provided.

A plate shaped battery according to another aspect of the present invention includes the wrapping member and the exterior member. The wrapping member seals the power generating element generating power. One part of the wrapping member and the other part thereof overlap with each other to form a seal portion and the wrapping member has the shape of a wrapper. The exterior member has a recess for receiving the seal portion.

Since in a plate shaped battery constructed in such a way, the recess is formed, the seal portion is fittingly put in the recess. Therefore, the wrapping member is surly positioned by the recess. In addition, since the seal portion is fittingly put in the recess, a plate shaped battery with the seal portion fittingly received in the recess can be downsized compared with a plate shaped battery with the seal portion not fittingly received in a recess.

Moreover, preferably, the exterior member has an electrical conductivity and surrounds the wrapping member. Since in this case, the exterior member has electrical conductivity and surrounds the wrapping member, the exterior member electromagnetically shields the power generating element. As a result, the power generating element does not modulate a high frequency current flowing in a circuit board of a portable radio terminal, thereby improving reliability of a plate shaped battery.

More preferably, the exterior member is electrically connected to one of the anode terminal and the cathode terminal. In this case, a potential of the exterior member is the same as a potential of one of the anode terminal and the cathode terminal and shows a constant value. Therefore, the electromagnetic shield effect described above is further improved, thereby in turn improving reliability of a plate shaped battery.

More preferably, the anode terminal and the cathode terminal extend from almost a middle portion of the power generating element to the outside thereof. The plate shaped battery further includes a support member supporting the anode terminal or the cathode terminal extending to the outside thereof. Since in this case, the anode terminal or the cathode terminal is supported by the support member, the anode terminal and the cathode terminal are surly positioned. With such a construction, the anode terminal and the cathode terminal are not bent even when a force from a contact pin is exerted on the anode terminal or the cathode member. As a result, each of the anode terminal and the cathode terminal can achieve sure electrical contact with another terminal, whereby a high reliability plate shaped battery can be provided.

A portable radio terminal according to the another aspect of the present invention uses a plate shaped battery described above. Since in this case, the wrapping member is more surely positioned by the recess and a downsized plate shaped battery is used, a high reliability, downsized portable radio terminal can be provided.

BRIEF DESCRIPTION OF THE DRAWINGS

FIG. 30 is a perspective view of a prior art plate shaped battery;

FIG. 31 is a sectional view taken on line XXXI—XXXI of FIG. 30; and

FIG. 32 is a sectional view taken on line XXXII—XXXII of FIG. 30.

BEST MODE FOR CARRYING OUT THE INVENTION

Description will be given of the best mode for carrying out the present invention below with reference to the accompanying drawings:

First Embodiment

Figure 1A:
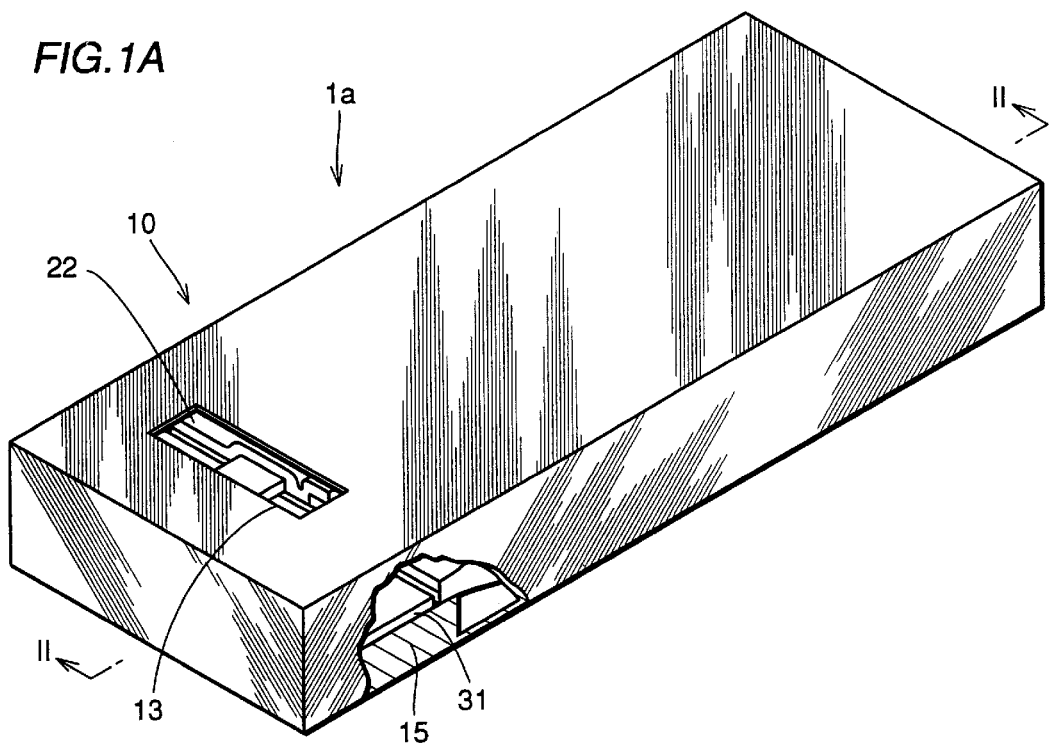
FIG. 1A is a perspective view including a partial section of a plate shaped battery according to a first embodiment of the present invention.

Referring to FIG. 1A, a plate shaped battery 1a according to the first embodiment of the present invention has a case 10. The case 10 has the shape of a rectangular parallelepiped having six faces. The case 10 is constructed with walls of a resin sheet of 0.3 to 1.2 mm in thickness. A case window 13 is formed on one of the largest faces of the rectangular parallelepiped. The case window 13 is almost a rectangle of 0.5 mm in length by 2.5 mm in width. Through the case window 13, seen is a laminated film 22 constituting the plate shaped battery 1a. A protruding portion 15 as a support member is formed at the bottom of the case 10. A printed board 31 is placed on the protruding portion 15. The protruding portion 15 is fabricated in one body with the case 10. Note that the protruding portion 15 may be fabricated with a substance different from the case 10.

Figure 1B:
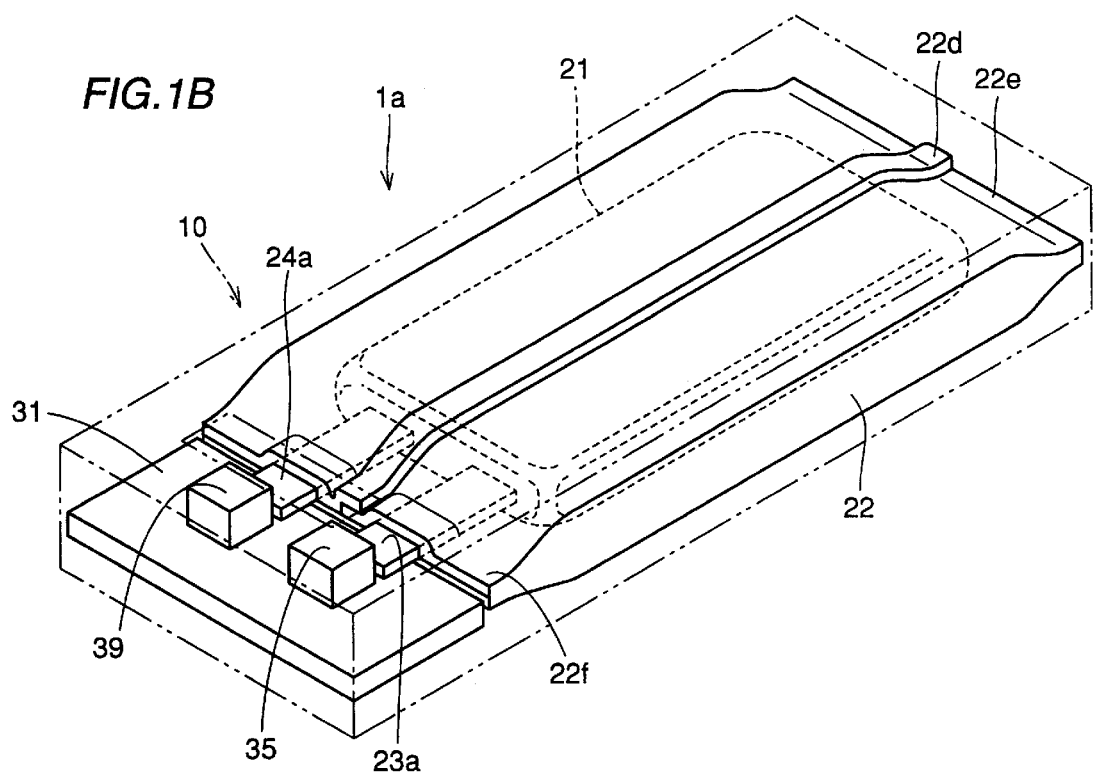
FIG. 1B is a perspective view showing an internal construction of a plate shaped battery according to the first embodiment of the present invention.

Referring to FIG. 1B, the plate shaped battery 1a according to the first embodiment includes: a battery core 21 as a power generating element; a laminated film 22 as a wrapping member; anode terminals 24a and 39; cathode terminals 23a and 35; and the case 10 as an exterior member.

The case 10 surrounds the battery core 21 and the laminated film 22. Note that while in FIG. 1, the plate shaped battery 1a is shown as a perspective view as if the interior of the case 10 could be seen from the outside, actually part of the laminated film 22 in the case 10 can be seen limitedly through the case window 13.

The battery core 21 is positioned in place in the case 10. The battery core 21 is formed by winding a prescribed laminate in turns one on top of the other. The laminate is constructed of a first thin plate (a current collector aluminum foil); a second thin plate (a current collector copper foil); and a separator interposing therebetween. The current collector aluminum foil is electrically connected to the anode terminal 24a. The current collector copper foil is electrically connected to the cathode terminal 23a. Therefore, the battery core 21 is electrically connected to the anode terminal 24a and the cathode terminal 23a. The current collector aluminum foil is coated with a metal oxide containing lithium (an anode active substance) thereon. The current collector copper foil is coated with an organic substance containing lithium (a cathode active material).

The anode terminal 24a and the cathode terminal 23a are both constituted of an aluminum foil. A thickness thereof is in the range of 0.2 mm to 0.5 mm and dimensions of a plan view are 7 mm in length by 4 mm in width.

The anode terminal 24a and the cathode terminal 23a are supported by the protruding portion 15 with the print board 31 interposing therebetween. On the print board 31, a circuit is provided that works such that as a current amount supplied to a portable telephone from the plate shaped battery increases, the circuit reduces the current amount.

The anode terminal 39 and the cathode terminal 35 are placed on the print board 31. The anode terminal 39 is electrically connected to the anode terminal 24a, and supported by the protruding portion 15 with the printed board 31 interposing therebetween. The cathode terminal 35 is electrically connected to the cathode terminal 23a and supported by the protruding portion 15 with the printed board 31 interposing therebetween. The case window 13 is located above the anode terminal 39 and the cathode terminal 35.

On the laminated film 22, seal portions 22d and 22e, and an electrode seal portion 22f are formed. The seal portion 22d is located on the battery core 21 and formed by contact bonding two ends of one laminated film 22 overlapping with each other. While a variety of contact boding methods for the laminated film 22 are conceivable, two methods, for example, can be taken up, one is to apply an adhesive between the laminated films 22 to glue and the other is to cause the laminated films 22 to adhere to each other by hot melting.

The seal portion 22e is formed at the rear end of the plate shaped battery 1a. The seal portion 22e is formed by contact boding two parts of the laminated film 22 one on the other. The seal portion 22e extends in a direction perpendicular to a direction along which the seal portion 22d extends.

The electrode seal portion 22f seals the anode terminal 24e and the cathode terminal 23a with two parts of the laminated film 22. The electrode seal portion 22f extends in a direction almost in parallel to a direction along which the seal portion 22e extends and in the direction almost perpendicular to a direction along which the seal portion 22d extends. The anode terminal 24a and the cathode terminal 23a sealed by the electrode seal portion 22f extend along a direction from almost a middle potion of the battery core 21 along which the seal portion 22d extends.

The laminated film 22 seals the battery core 21 with the help of the seal portions 22d and 22e, and the electrode seal portion 22f. Furthermore, the laminated film 22 is formed into a wrapper shape with the help of the seal portions 22d and 22e, and the electrode seal portion 22f. The case 10 is positioned so as to surround the laminated film 22 of a wrapper shape. The laminated film 22 wraps parts of the anode terminal 24a and the cathode terminal 23a, respectively, except the other parts which are exposed.

Figure 2:
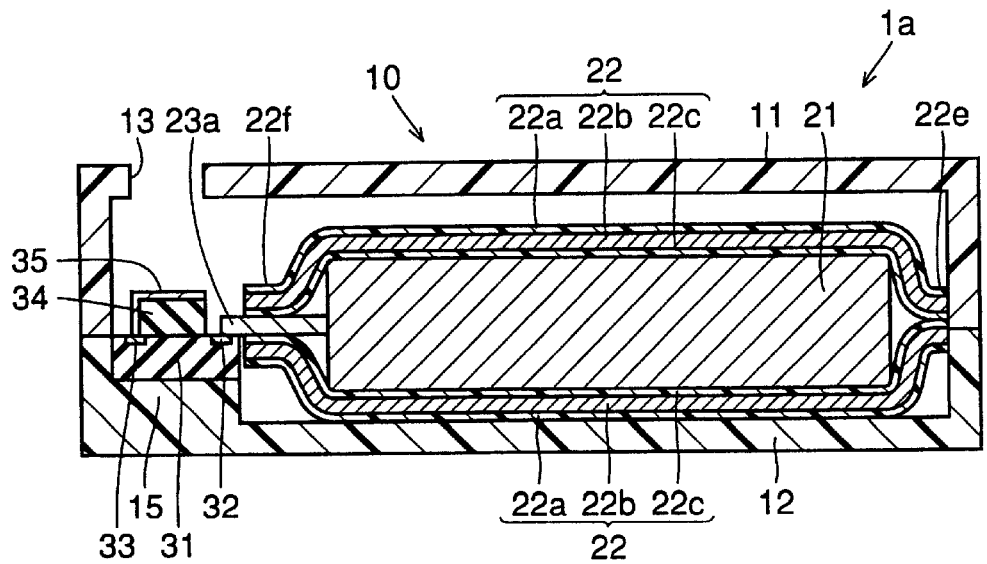
FIG. 2 is a sectional view taken on line II—II of FIG. 1A.

Referring to FIG. 2, the plate shaped battery 1a has the case 10 in the shape of almost a rectangle in section. The case 10 is constructed of an upper case member 11 and a lower case member 12. The upper and lower member cases 11 and 12 are mutually connected. The lower case member 12 has the protruding portion 15 as support means supporting the cathode terminals 23a and 35 with the printed board 31 interposing therebetween. The protruding portion 15 is formed in one body with the lower case member 12 and made of a substance similar to the lower case member 12. The lower case member 12 supports the upper case member 11. The case window 13 is formed on the upper case member 11 for use in inserting a contact pin of a portable telephone or the like.

In the interior of the case 10, the battery core 21, the laminated film 22, the cathode terminals 23a and 35, the printed board 31 and a terminal rest 34. The laminated film 22 is constructed of: resin layers 22a and 22c made from a high polymer resin: and an aluminum foil 22b sandwiched by the resin layers 22a and 22c. The laminated film 22 is not limited to a three layer structure as shown in FIG. 2, but can also be of a four or more layer structure adding a resin layer or layers to the three layer structure. Still another variation conceivable is a two layer structure formed by removing the resin layer 22a.

The seal portion 22e is formed at the rear end of the plate shaped battery 1a by mutually contact bonding two parts of the laminated film 22.

The electrode seal portion 22f is formed so as to seal the cathode terminal 23a and the anode terminal 24a shown in FIG. 1 by contact bonding two parts of the laminated film 22 mutually. The seal portion 22e and the electrode seal portion 22f are formed so as to extend from the front side of the sheet on which the figure is shown to the rear side thereof. The printed board 31 is placed on the protruding portion 15 in the vicinity of the electrode seal portion 22f. On the printed board 31, formed are a wire 32 electrically connected to the cathode terminal 23a and a wire 33 electrically connected to the cathode terminal 35. The cathode terminal 23a extends from the middle portion of the plate shaped battery 1a to the outside thereof and the distal end thereof is in contact with the wire 32 on the print board 31. Moreover, the terminal rest 34 is placed on the printed board 31. The cathode terminal 35 made from a metal is provided on a surface of the terminal rest 34. The cathode terminal 35 is electrically connected to the wire 33. The wires 33 and 32 are electrically connected to each other. Consequently, the cathode terminal 35 is electrically connected to the cathode terminal 23a.

In the plate shaped battery 1a constructed in such a way, the cathode terminals 23a and 35 and the anode terminals 24a and 39 are positioned being supported by the protruding portion 15 with the print board 31 interposing therebetween with sureness. Hence, even when a force is exerted on the cathode terminal 35 and the anode terminal 39 through a contact pin in order to obtain electrical contact with the cathode terminal 35 and the anode terminal 39, no change occurs in positions of the cathode terminal 35 and the anode terminal 39. As a result, no chance occurs of loose contact between the cathode terminal 35 or the anode terminal 39, and the contact pin, whereby a high reliability plate shaped battery can be provided.

Second Embodiment

Figure 3:
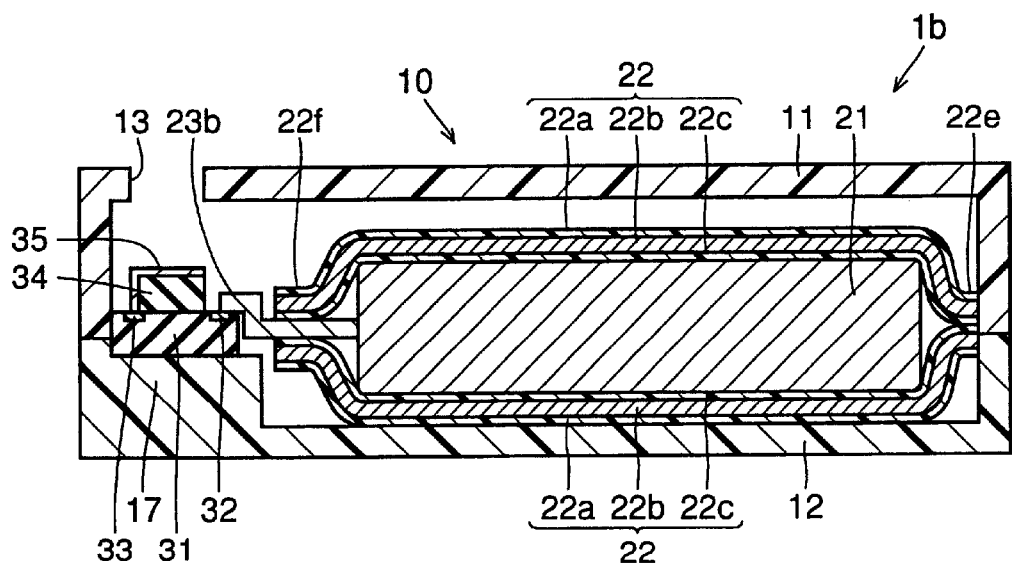
FIG. 3 a sectional view of a plate shaped battery according to a second embodiment of the present invention.

Referring to FIG. 3, a plate shaped battery 1b according to the second embodiment of the present invention is different from the plate shaped battery 1a shown in FIG. 2 in structures of a protruding portion 17 and a cathode terminal 23b. A height of the protruding portion 17 is more than that of the protruding portion 15. The cathode terminal 23b has a partly raised end for electrical connection to the wire 32. The cathode terminal 23b and the protruding portion 17 have no direct contact with each other. The laminated film 22 may extend into between the protruding portion 17 and the cathode terminal 23b.

The structures of a printed board 31, wires 32 and 33, a terminal rest 34 and a cathode terminal 35 are similar to those shown in FIG. 2. Since the protruding portion 17 is higher than that of the protruding portion 15, a distance between the cathode terminal 35 and a case window 13 is less than that between the case window 13 and the cathode terminal 35 shown in FIG. 2. Moreover, though being not shown in FIG. 3, an anode terminal having a shape similar to the cathode terminal 23b is disposed on the rear side of the sheet on which the figure is shown. The anode terminal is in contact with the print board 31, and another terminal rest and another anode terminal are formed at the distal end.

The plate shaped battery 1b constructed in such a way has an effect similar to that of the plate shaped battery 1a shown in the first embodiment. Moreover, since a distance between the case window 13 and the cathode terminal 35 decreases, there is another effect of enabling surer electrical connection between a portable telephone and the cathode terminal 35.

Third Embodiment

Figure 4:
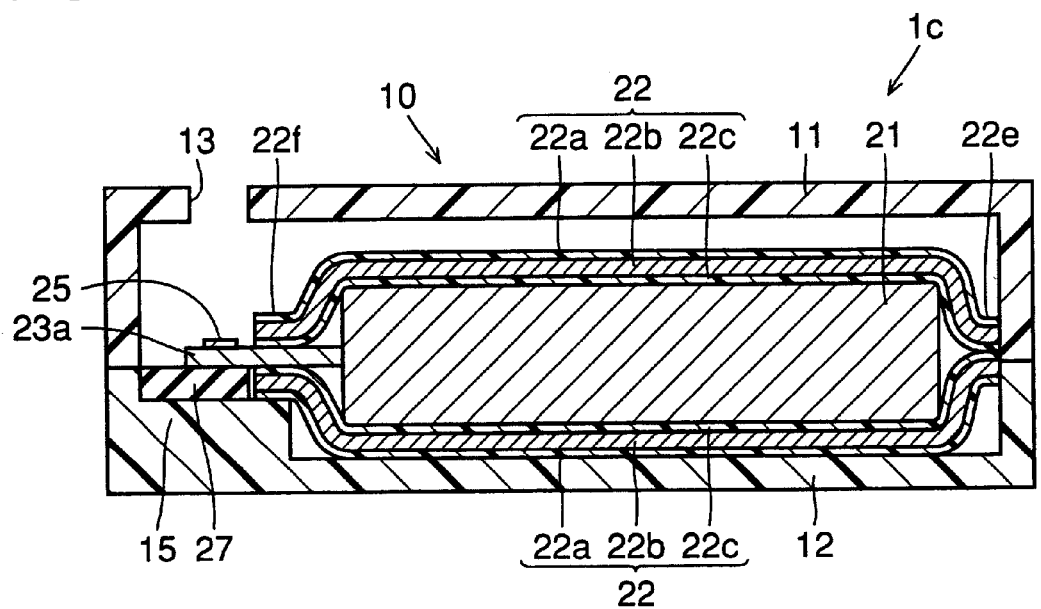
FIG. 4 is a sectional view of a plate shaped battery according to a third embodiment of the present invention.

Referring to FIG. 4, a plate shaped battery 1c according to the third embodiment of the present invention is different from the plate shaped battery 1a according to the first embodiment shown in FIG. 2 in a structure on the protruding portion 15. A print board 27 is placed on a protruding portion 15. Part of a laminated film 22 is placed on the protruding portion 15. The cathode terminals 23a and 25 is placed on the print board 27. A case window 13 is located above the cathode terminal 25.

The plate shaped battery 1c constructed in such a way has an effect similar to that of the plate shaped battery 1a shown in FIG. 2. Furthermore, since no terminal rest 34 exists, an effect is enjoyed to simplify a structure.

Fourth Embodiment

Figure 5:
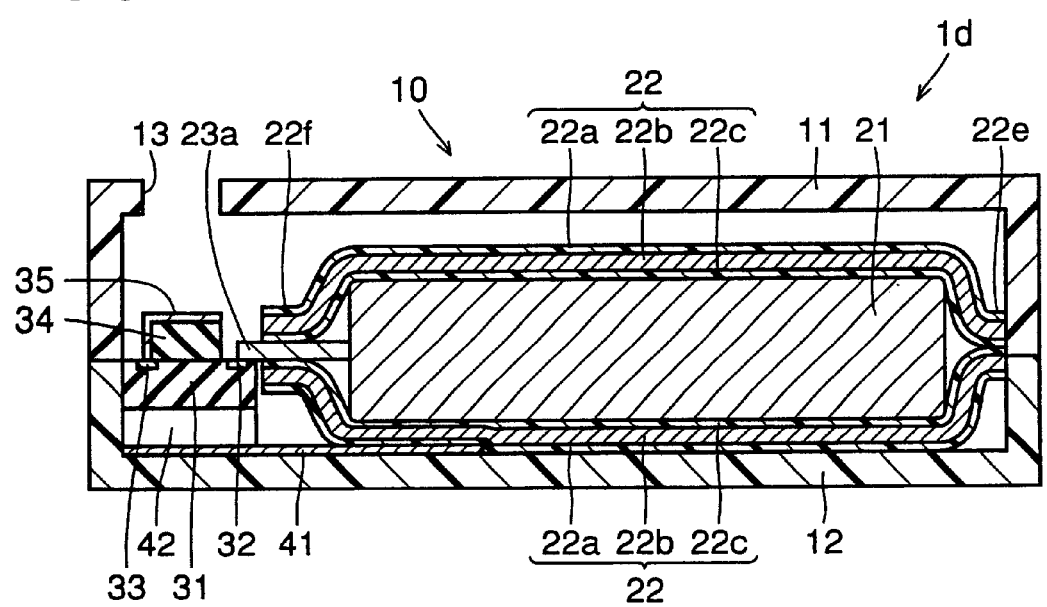
FIG. 5 is a sectional view of a plate shaped battery according to a fourth embodiment of the present invention.

Referring to FIG. 5, a plate shaped battery 1d according to the fourth embodiment has a metal plate 41 as a heat transfer member on a lower case member 12. A temperature detector 42 is provided on the lower case member 12 in contact. Furthermore, the metal plate 41 is in contact with a resin layer 22a of a laminated film 22. Structures of the other constituents of the plate shaped battery 1d shown in FIG. 5 are similar to those of the plate shaped battery 1a shown in FIG. 2.

When the plate shaped battery 1d operates, heat is generated from a battery core 21. The heat is transferred to the temperature detector 42 through the laminated film 22 and the metal plate 41. As a temperature of the battery core 21 increases, the heat is transferred to the temperature detector 42. Then, a signal is sent from the temperature detector 42 to a printed board 31. A current between wires 32 and 33 on the print board 31 is cut off in response to the signal. By doing so, current supply from the battery core 21 to a portable telephone or the like device can be cut off to reduce temperature of the battery core 21.

The plate shaped battery 1d constructed in such a way has an effect similar to that of the plate shaped battery 1a shown in the first embodiment. Moreover, support means can be formed without adding a special component for the temperature detector 42 since the temperature detector 42 performs a role of support means supporting the cathode terminals 23a and 35.

Fifth Embodiment

Figure 6:
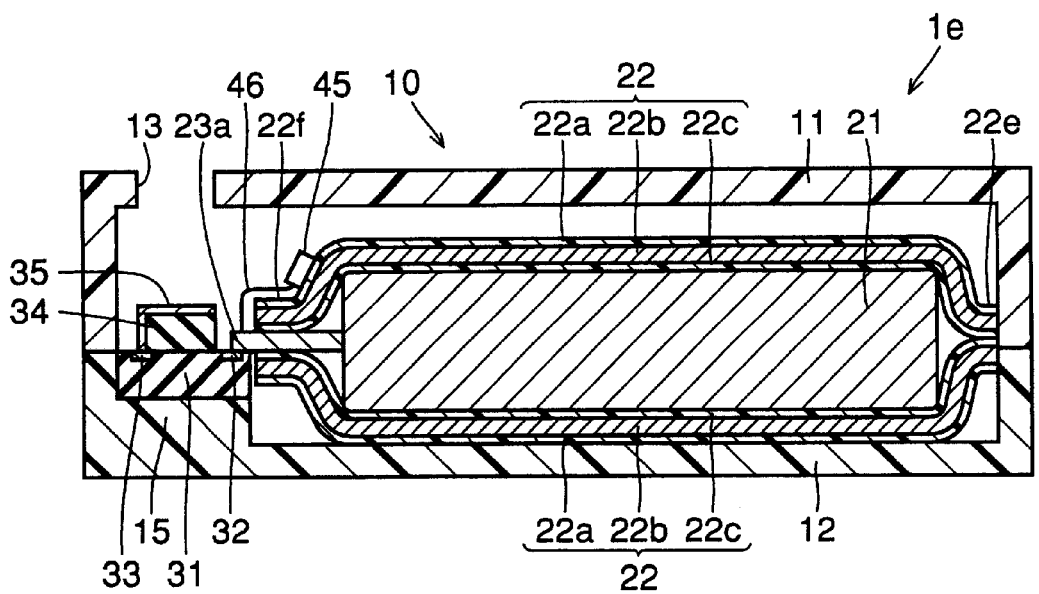
FIG. 6 is a sectional view of a plate shaped battery according to a fifth embodiment of the present invention.

Referring to FIG. 6, a plate shaped battery 1e according to the fifth embodiment of the present invention has PTC 45 (Positive Temperature Coefficient) on the electrode seal portion 22f. The PTC45 is connected to a cathode terminal 23a through a wire 46. The PTC plays a role as a temperature detecting sensor and works to cut off power supply from the cathode terminal 23a to a portable telephone when a temperature of a battery core 21 rises to a prescribed value or more.

The plate shaped battery 1e constructed in such a way has an effect similar to that of the plate shaped battery 1a shown in the first embodiment. Moreover, with the PTC45 provided, a current is cut off at a high temperature; thereby offering a higher level of safety.

Sixth Embodiment

Figure 7:
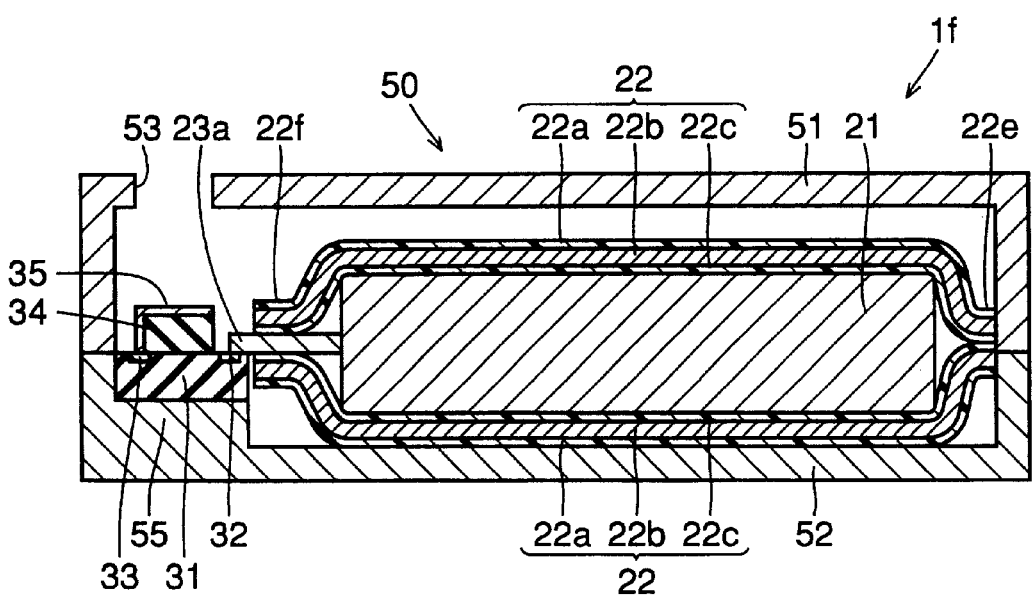
FIG. 7 is a sectional view of a plate shaped battery according to a sixth embodiment of the present invention.

Referring to FIG. 7, a plate shaped battery 1f according to the sixth embodiment of the present invention is different from the plate shaped battery 1a shown in the first embodiment in that an upper case member 51 and a lower case member 52 constituting a case 50 are made from an aluminum alloy. Furthermore, a protruding portion 55 is formed on the lower case member 52. The protruding portion 55 is formed in one body with the lower case member 52. Insulation between a battery core 21 and the upper case member 51 or the lower case member 52 is ensured by a laminated film 22. Moreover, insulation between each of cathode terminals 23a and 53 and each of the upper case member 51 and the lower case member 52 is ensured by a print board 31. A case window 53 is provided above the cathode terminal 35. The case window 53 has a shape similar to the case window 13.

The plate shaped battery 1f constructed in such a way has an effect similar to the plate shaped battery 1a shown in the first embodiment. Moreover, since the upper case member 51 and the lower case member 52 constituting the case 50 are both electrically conductive, the case 50 electromagnetically shields the battery core 21. As a result, a high frequency current flowing in a circuit board of a portable telephone or the like is not modulated even when the plate shaped battery 1f is disposed close to the circuit board of the portable telephone or the like. Consequently, a higher reliability plate shaped battery is attained.

Seventh Embodiment

Figure 8:
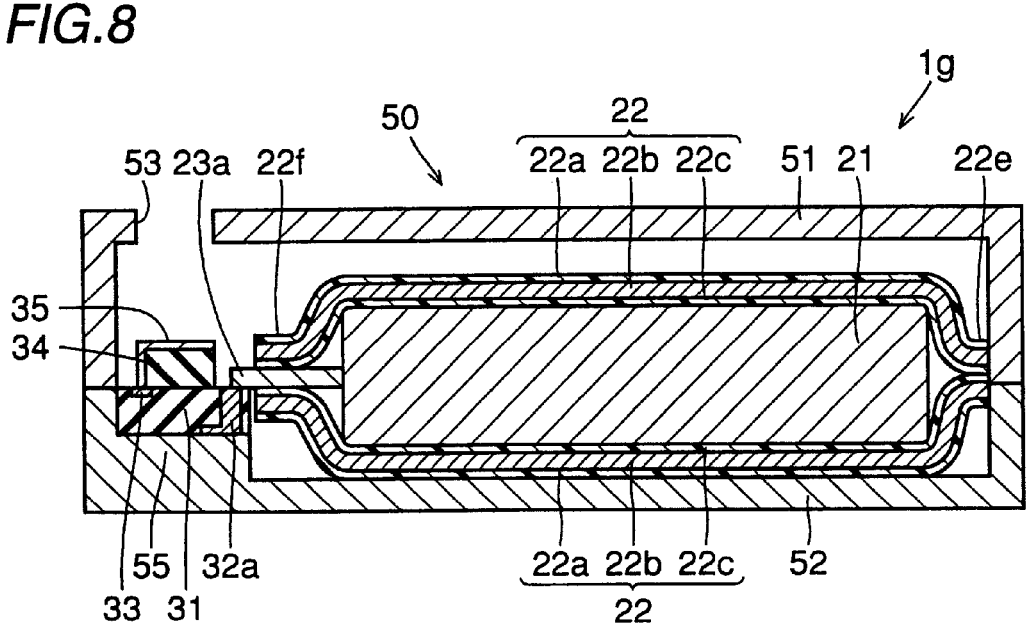
FIG. 8 is a sectional view of a plate shaped battery according to a seventh embodiment of the present invention.

Referring to FIG. 8, a plate shaped battery 1g according to the seventh embodiment of the present invention is different from the plate shaped battery if according to the sixth embodiment shown in FIG. 7 wherein the wire 32 is not in contact with the protruding portion 55 in that a wire 32a connected to both of the protruding portion 55 and the cathode terminal 23a is provided on a printed board 31. With such a construction, in the plate shaped battery 1g, potentials of an upper case member 51 and a lower case member 52 are equal to that of a cathode terminal 23a and shows a constant value.

The plate shaped battery 1g constructed in such a way, firstly, has an effect similar to that of the plate shaped butter if of the sixth embodiment shown in FIG. 7. Moreover, potentials of the upper case member 51 and the lower case member 52 are the same as that of the cathode terminal 23a and shows a constant value. As a result, even when the upper case member 51 and the lower case member 52 is in capacitive coupling with the circuit board of a portable radio device, potentials of the upper and lower case members 51 and 52 are constant; therefore, no variation in potential of the circuit board occurs. Consequently, a high frequency current flowing in the circuit board is not modulated, thereby obtaining a high reliability plate shaped battery.

Eight Embodiment

Figure 9:
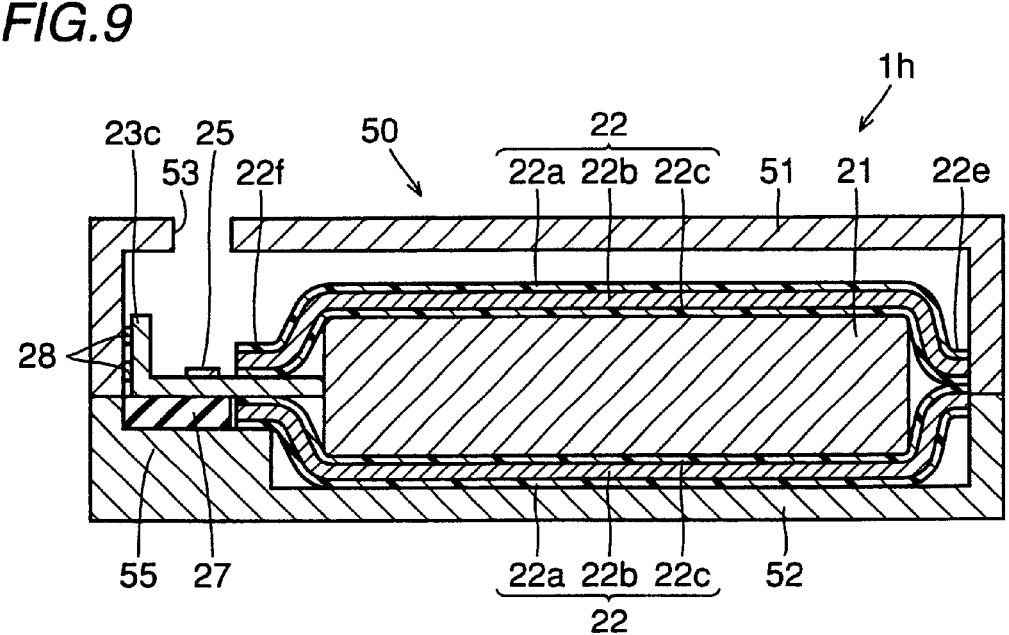
FIG. 9 is a sectional view of a plate shaped battery according to an eighth embodiment of the present invention.

Referring to FIG. 9, a plate shaped battery 1h according to the eighth embodiment of the present invention is different from the plate shaped battery if shown in FIG. 7 in structure above a protruding portion 55. A print board 27 is placed on a protruding portion 55. A cathode terminal 23c of a L letter shape is provided on the print board 27. The cathode terminal 23c is electrically connected to the battery core 21. A cathode terminal 25 for contact with a contact pin is provided on the cathode terminal 23c. The cathode terminal 23c is in contact with the upper case member 51 through a weld portion 28. Hence, potentials of the upper and lower case members 51 and 52 becomes equal to a potential of the cathode terminal 23c and the potentials of the upper and lower case members 51 and 52 become almost constant.

The plate shaped battery 1h constructed in such a way, firstly, has an effect similar to the plate shaped battery 1g shown in the seventh embodiment. Moreover, another effect of a reduced fabrication cost is obtained because of none of the rest terminal 34 provided.

Ninth Embodiment

Figure 10:
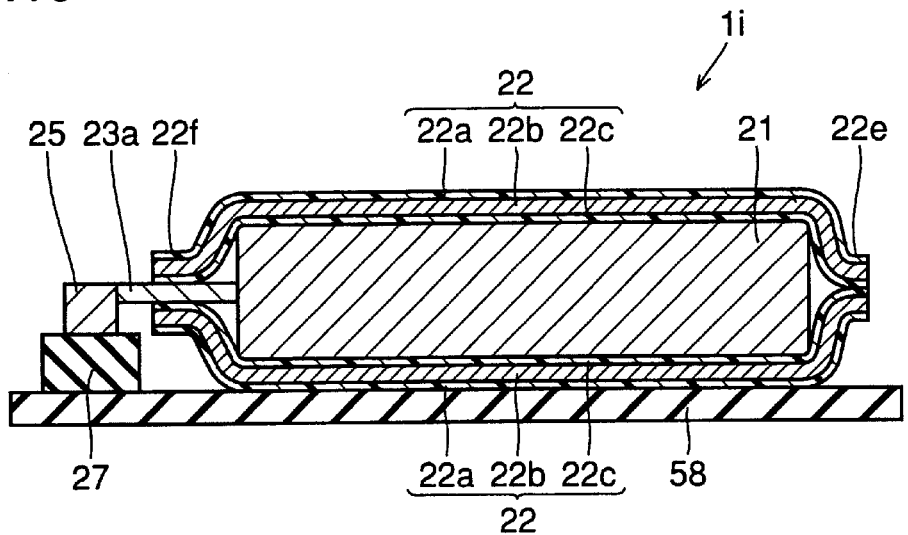
FIG. 10 is a sectional view of a plate shaped battery according to a ninth embodiment of the present invention.

Referring to FIG. 10, a plate shaped battery 1i according to the ninth embodiment of the present invention has a battery core 21 wrapped with a laminated film 22 on a support plate 58. A cathode terminal 23a extends from the battery core 21. A cathode terminal 23a is provided on the support plate 58 with a print board 27 as support means interposing therebetween. The cathode terminals 25 and 23a are directly connected to each other by spot welding. A contact pin of a portable telephone or the like is in contact with the cathode terminal 25 to supply power to the portable telephone from the plate shaped battery 1i.

The plate shaped battery 1i constructed in such a way as well has an effect similar to that of the plate shaped battery 1a shown in the first embodiment.

Tenth Embodiment

Figure 11:
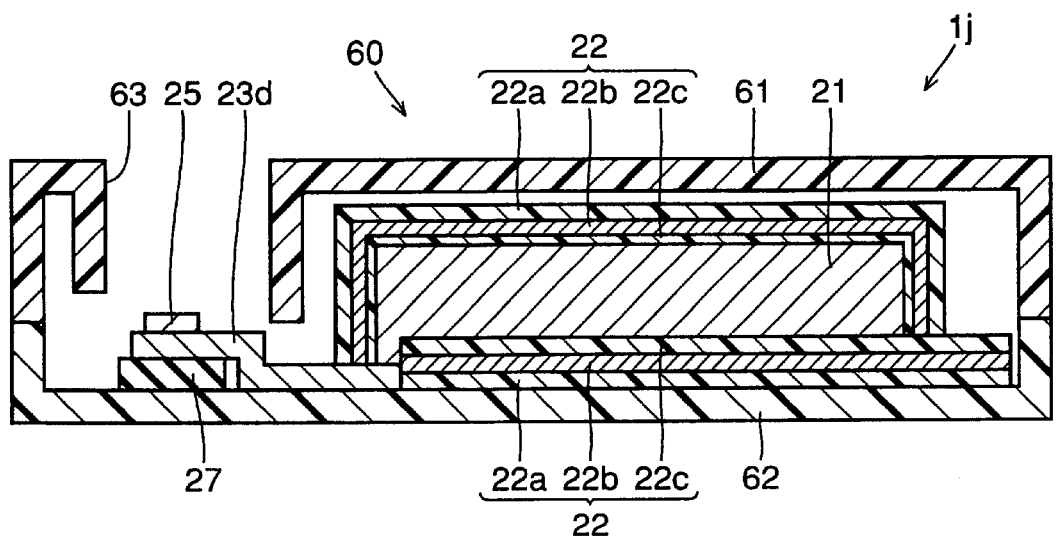
FIG. 11 is a sectional view of a plate shaped battery according to a tenth embodiment of the present invention.

Referring to FIG. 11, a plate shaped battery 1j according to the tenth embodiment of the present invention has a battery core 21 wrapped with a laminated film 22. The laminated film 22 has a shape different from those shown in the first to ninth embodiments, though being made of the same substance. That is, one end of the laminated film 22 extends in almost a straight line, while the other end thereof is bent so as to form a cavity. The battery core 21 is fittingly inserted in the cavity. A cathode terminal 23d is electrically connected to the battery core 21. The anode terminal 21d extends from a lower end portion of the battery core 21 and the free end thereof is bent. A cathode terminal of a shape similar to the cathode terminal 23d is provided on the rear side of the sheet on which the figure is shown. The anode terminal is also electrically connected to the battery core 21.

A case 60 is provided so as to surround the laminated film 22. The case 60 is made from plastics and constituted of an upper case member 61 and a lower case member 62. The upper and lower case members 61 and 62 are mutually connected. The upper case member 61 is provided with a case window 63. The distal end of the cathode terminal 23d is placed on a printed board 27 as support means. A cathode terminal 25 is further provided on the cathode terminal 23d. The cathode terminal 25 is to be put into contact with a contact pin of a portable telephone and made from a metal.

The plate shaped battery 1j constructed in such a way also has an effect similar to that of the plate shaped battery 1a shown in the first embodiment.

Eleventh Embodiment

Figure 12:
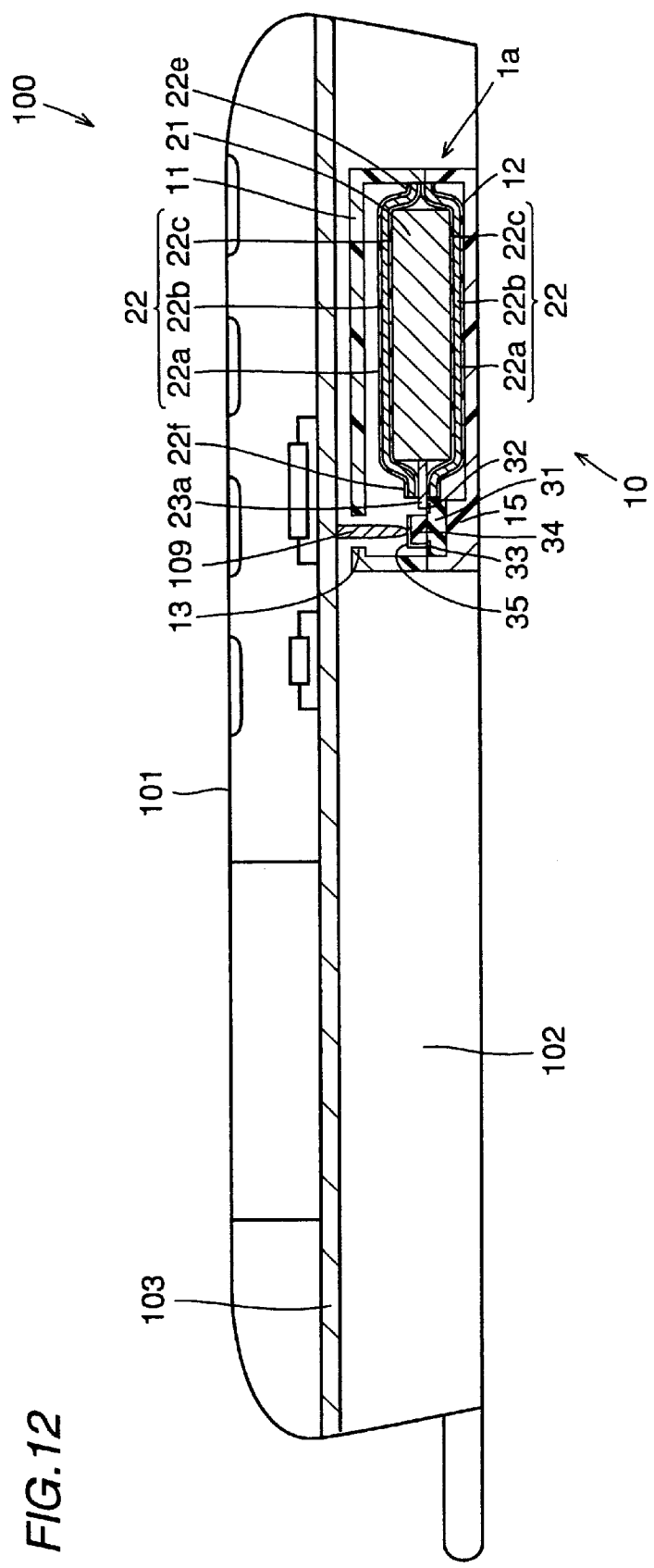
FIG. 12 is a sectional view of a portable telephone according to an eleventh embodiment of the present invention.

Referring to FIG. 12, a portable telephone 100 as a portable radio terminal includes: a telephone case 101; a rear case 102; a body board 103 as a circuit board for the portable telephone; and a plate shaped battery 1a.

The body board 103 is mounted to the telephone case 101 and the rear case 102. The plate shaped battery 1a is mounted to the rear case 102. The plate shaped battery 1a and the body board 103 are electrically connected to each other by a contact pin 109. An integrated circuit for a radio device is mounted on the body board 103. Power is supplied to the integrated circuit from the plate shaped battery 1a. The plate shaped battery 1a in this embodiment has the same construction as the plate shaped battery 1a shown in FIG. 2.

Furthermore, though not shown in FIG. 12, on the rear side of the sheet on which the figure is shown, provided are an anode terminal of the plate shaped battery 1a and a contact pin being put into contact with the anode terminal.

The portable telephone 100 constructed in such a way has a cathode terminal 35 supported by a protruding portion 15 with a print board 31 interposing therebetween. With such a construction, as shown in FIG. 12, even when a force is exerted on the cathode terminal 35, no change occurs in position of the cathode terminal 35. As a result, the cathode terminal 35 is surly positioned and sure contact with the contact pin 109 can also been assured. Consequently, obtainable is a high reliability portable telephone in which none of loose contact and other failures occur.

Twelfth Embodiment

Figure 13:
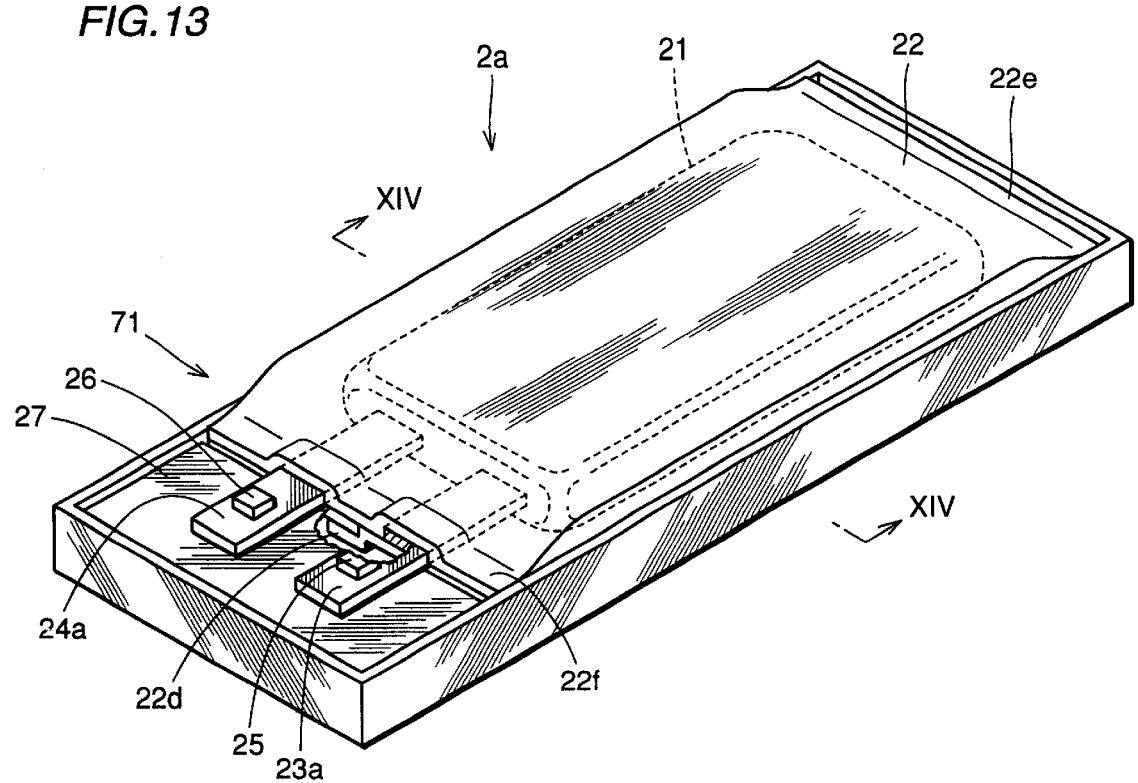
FIG. 13 is a sectional view of a plate shaped battery according to a twelfth embodiment of the present invention.

Referring to FIG. 13, a plate shaped battery 2a includes: a case 71 as an exterior member; a battery core 21 as a power generating element generating power; and a laminated film 22 as a wrapping member. The case 71 surrounds a lower and middle portions of the laminated film 22 except an upper portion thereof. Hence, the upper half of the laminated film 22 is exposed out of the case 71.

The laminated film 22 has an electrode seal portion 22f and a seal portion 22e formed thereon, similar to the electrode seal portion 22f and the seal portion 22e of FIG. 1. Both ends of the laminated film 22 overlap with each other and contact bonded under the plate shaped battery 2a to form the seal portion 22d. The seal portion 22d extends along the lower surface of the battery core 21. Moreover, the seal portion 22d extends in a direction almost perpendicular to a direction along which the electrode seal portion 22f and the seal portion 22e extend.

A groove (not shown in FIG. 13) for receiving the seal portion 22d is formed on the case 71. The case 71 is made from an aluminum alloy. The case 71 is of the shape of a rectangular parallelepiped having a large opening and the laminated film 22 and the battery core 21 combined are fittingly inserted. The battery core 21 is similar to the battery core 21 shown in FIG. 1 of the first embodiment. To the battery core 21, connected are an anode terminals 24a and a cathode terminal 23a extending in the same direction along which the seal portion 22d extends. A anode terminal 26 made from a metal is fixed onto the anode terminal 24a. The anode terminal 26 is a member for electrical contact with a contact pin of a portable telephone. The cathode terminal 25 made from a metal is fixed onto the cathode terminal 23a. The cathode terminal 25 is a member for electrical contact with a contact pin of the portable telephone.

Since the anode terminal 26 and the cathode terminal 25 are not surrounded by the case 71, the contact pins of the portable telephone can be easily put into contact with the anode terminal 26 and the cathode terminal 25, respectively, to obtain power.

Figure 14:
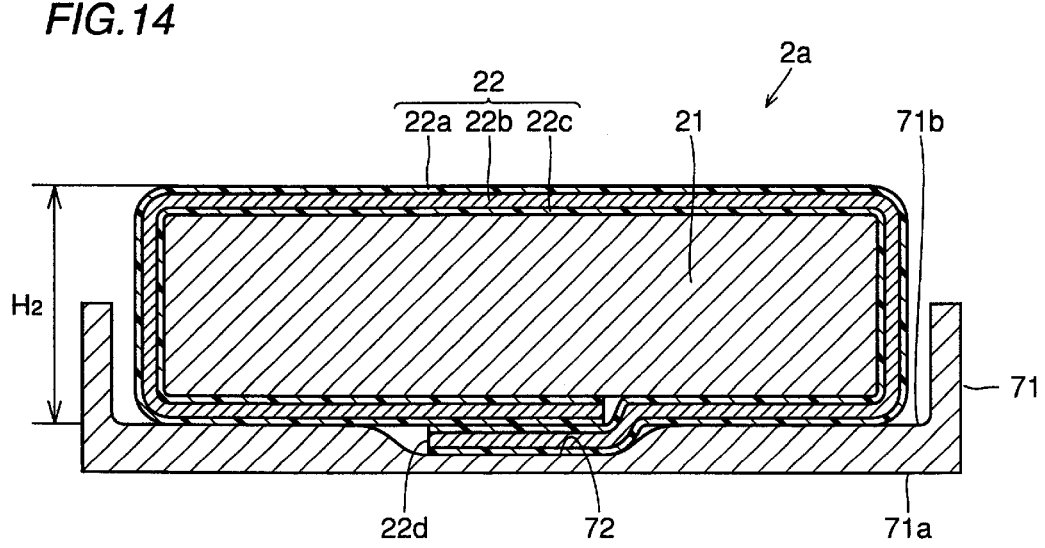
FIG. 14 is a sectional view taken on line XIV—XIV of FIG. 13.

Referring to FIG. 14, the battery core 21 wrapped with the laminated film 22 is placed in the case 71 of the plate shaped battery 2a. A groove 72 as a recess is formed on the case 71. A width of the battery core 21 is smaller than a width of the case 71. The upper half of the battery core 21 is not surrounded by the case 71. The seal portion 22d obtained by overlapping both ends of the laminated film 22 therebetween is put in the groove 72 of the case 71. Hence, the laminated film 22 and the case 71 are put into contact with each other in the groove 72 and an inner surface 71b of the other part of the case 71, where the groove is not formed, is also in contact with the laminated film 22.

The inner surface 71b is a flat surface with almost no curvature except a portion where the groove 72 is formed. Gaps arise between the laminated film 22 and the case 71 at boundaries between the inner surface 71b and the groove 72. An outer surface 71a of the case 71 is also a flat surface with almost no curvature and extends in parallel to the inner surface 71b.

In the plate shaped battery 2a constructed in such a way, the seal portion 22d is fittingly put into the groove 72. Hence, the seal portion 22d is in contact with an inner surface of the groove 72 and the laminated film 22 is also in contact with the inner surface 71b of the case 71 in the other portion thereof in which the seal portion 22d is not formed. With such a construction, a great part of all the surface of the laminated film 22 stays in contact with the case 71 and thereby, the laminated film 22 and the battery core 21 are surly positioned by the case 71. Furthermore, with the groove 72 provided, the seal portion 22d having a thickness relatively more than the other part of the laminated film 22 is put in the groove 72 as a recess; therefore, a height $H_2$ (=0.2 to 5.7 mm) of the top surface of the upper portion of the laminated film 22 above the inner surface 71b of the case 71 is less compared with a prior art practice. Consequently, there arises an effect of enabling a size of the plate shaped battery 2a to decrease.

Thirteenth Embodiment

Figure 15:
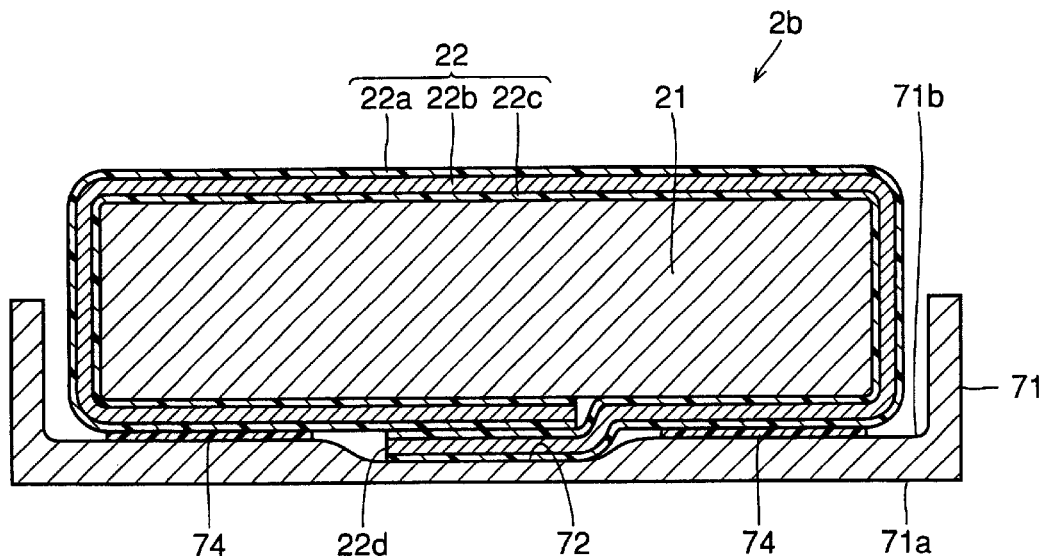
FIG. 15 is a sectional view of a plate shaped battery according to a thirteenth embodiment of the present invention.

Referring to FIG. 15, a plate shaped battery 2b according to the thirteenth embodiment has a double-faced adhesive tape 74 provided between an inner surface 71b of a case 71 and a laminated film 22. The double-faced adhesive tape is made from organic substances and works such that the laminated film 22 is caused to adhere to the inner surface 71b of a case 71. A seal portion 72d of the laminated film 22 is fittingly put into a groove 72 to be in contact with the inner surface of the groove 72. The other points in construction of the plate shaped battery 2b are similar to corresponding points in construction of the plate shaped battery 2a.

The plate shaped battery 2b constructed in such a way, firstly, has an effect similar to that of the plate shaped battery 2a according to the twelfth embodiment. Moreover, the laminated film 22 can be more firmly positioned by providing the double-faced adhesive tape 74 between the laminated film 22 and the case 71 as an exterior member.

Fourteenth Embodiment

Figure 16:
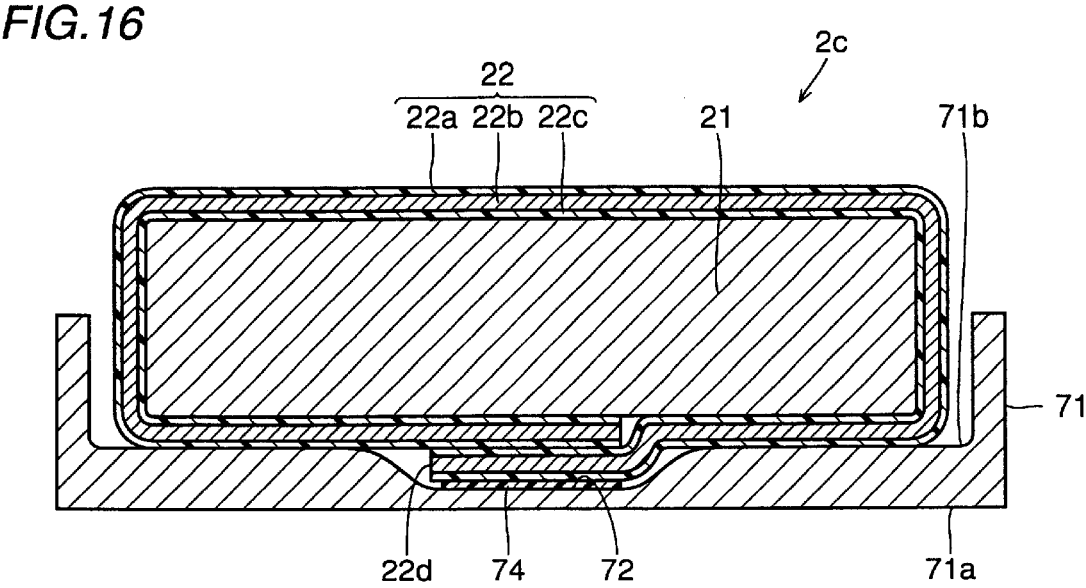
FIG. 16 is a sectional view of a plate shaped battery according to a fourteenth embodiment of the present invention.

Referring to FIG. 16, a plate shaped battery 2c according to the fourteenth embodiment of the present invention has a double-faced adhesive tape 74 provided between a groove 72 and a seal portion 22d. A laminated film 22 and an inner surface 71b of a case 71 are in contact with each other. The double-faced adhesive tape 74 is provided at the deepest portion of the groove 72 and plays a role to fix the laminated film 22 to the case 71. The other points in construction of the plate shaped battery 2c are similar to corresponding points in construction of the plate shaped battery 2a.

The plate shaped battery 2c constructed in such a way, firstly, has an effect similar to that of the plate shaped battery 2a shown in the twelfth embodiment. Moreover, since the double-faced adhesive tape 74 is provided in the groove 72, a distance from an outer surface 71a to the top surface of the laminated film 22 can be less than that in the case of the plate shaped battery 2c shown in FIG. 15, thereby enabling further downsizing a plate shaped battery.

Fifteenth Embodiment

Figure 17:
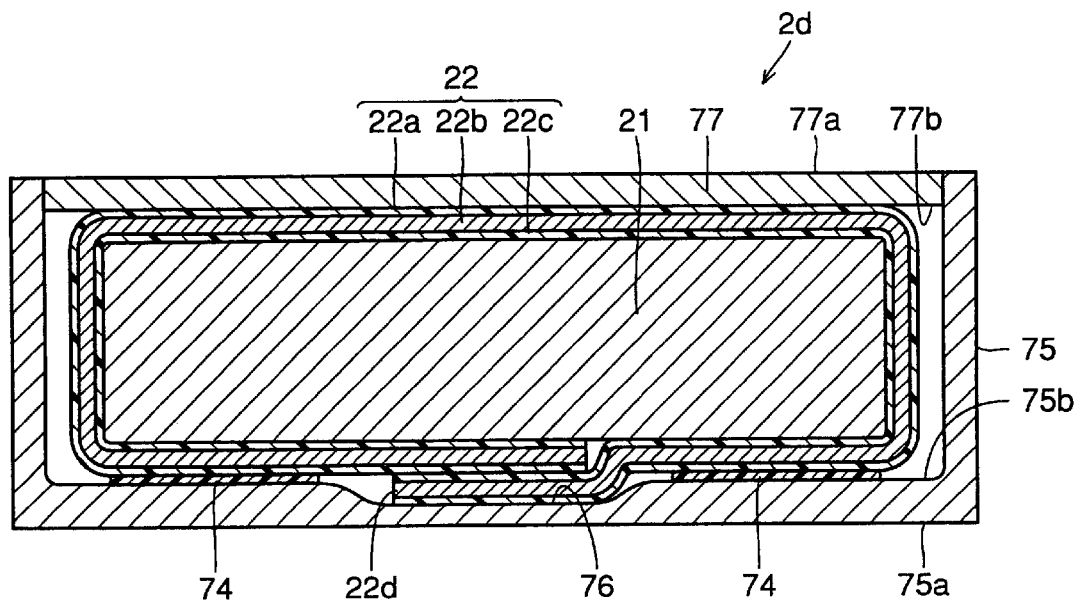
FIG. 17 is a sectional view of a plate shaped battery according to a fifteenth embodiment of the present invention.

Referring FIG. 17, a plate shaped battery 2d according to the fifteenth embodiment of the present invention includes: a battery core 21; a laminated film 22; and an upper case member 77 and a lower case member 75 as exterior members. The laminated film 22 wraps the battery core 21. The battery core 21 and the laminated film 22 are surrounded by the upper and lower case members 77 and 75.

The laminated film 22 has a structure similar to the laminated film 22 shown in FIG. 14 and both ends thereof overlap with each other and contact bonded to form a seal portion 22d.

The upper case member 77 is made from an aluminum alloy. Outer and inner surfaces of the upper case member 77 each are almost a flat surface with no curvature. The inner surface 77b is in direct contact with the laminated film 22 and plays a role to dissipate out heat generated in the battery core 21.

The lower case member 75 has a large opening and the upper case member 77 is engaged in the opening. The laminated film 22 and the battery core 21 are positioned in a space surrounded by the upper and lower case members 77 and 75. A groove 76 is formed on an inner surface 75b of the lower case member 75. The groove 76 is formed so as to extend from the front side of the sheet on which the figure is shown to the rear side thereof in a straight line. The inner surface 75b has a flat surface with no curvature except a portion in which the groove is formed. An outer surface 75a located on the other side of the case wall from the inner surface 75b is also almost a flat surface with no curvature.

On the inner surface 75b, provided is a double-faced adhesive tape 74 for fixing the laminated film 22. The double-faced adhesive tape 74 is provided so as to extend along a direction along which the groove 76 extends. The double-faced adhesive tape 74 is provided so as to extend from the front side of the sheet on which the figure is shown to the rear side thereof. The double-faced adhesive tapes 74 are provided on both sides of the groove 76.

When the plate shaped battery 2d constructed in such a way is mounted to a portable telephone, it is possible that the lower case member 75 faces the body of a portable telephone, while the upper case member 77 faces the cover side of the portable telephone. Moreover, contrary to this, it is also possible that the lower case member 75 faces the cover side of the portable telephone, while the upper case member 77 faces the body of the portable telephone.

The plate shaped battery 2d constructed in such a way, firstly, has an effect similar to that of the plate shaped battery 2a according to the twelfth embodiment. Moreover, since the upper and lower case members 77 and 75 surround the battery core 21, the upper and lower case members 77 and 75 electromagnetically shield the battery core 21. As a result, the battery core 21 acts no influence on the circuit board of a portable telephone and thereby a higher reliability plate shaped battery can be obtained. In addition, since the laminated film 22 is fixed by the double-faced adhesive tape 74, there arises an effect that the laminated film 22 is firmly positioned.

Sixteenth Embodiment

Figure 18:
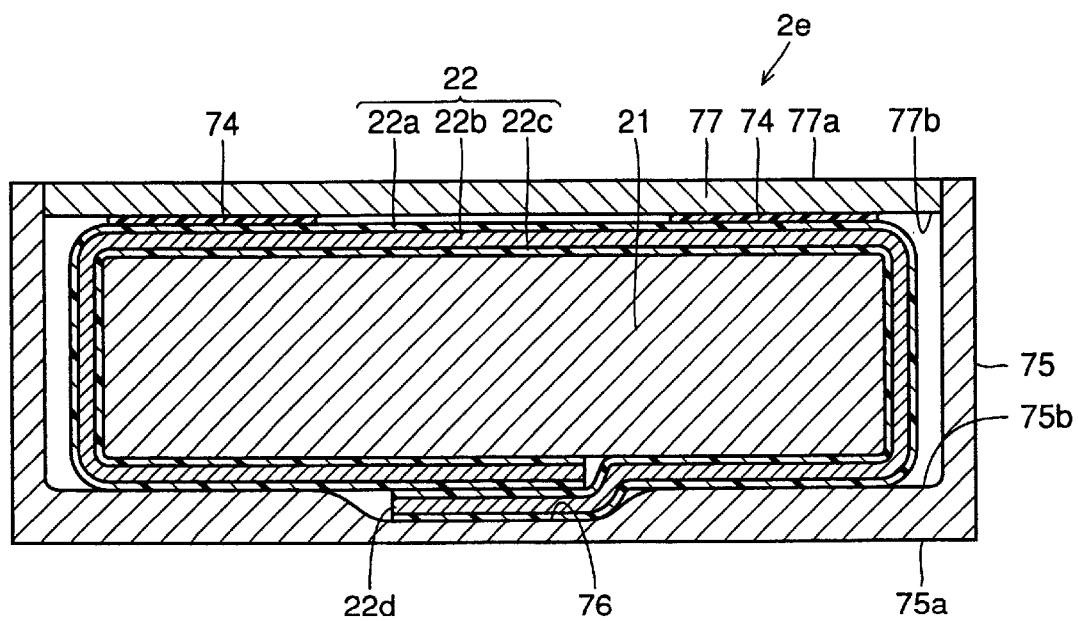
FIG. 18 is a sectional view of a plate shaped battery according to a sixteenth embodiment of the present invention.

Referring to FIG. 18, a plate shaped battery 2e according to the sixteenth embodiment 16 has a double-faced adhesive tape 74 for fixing a laminated film 22 to an upper case member 77. Hence, an inner surface 77b of the upper case member 77 is in no direct contact with the laminated film 22, but through the double-faced adhesive tape 74 in contact with the laminated film 22. An inner surface 75b of a lower case member 75 is direct contact with the laminated film 22. A groove 76 formed on the lower case member 75 is in direct contact with a seal portion 22d of the laminated film 22. The other points in construction of the plate shaped battery 2e shown in FIG. 18 are similar to corresponding points in construction of the plate shaped battery 2d shown in FIG. 17.

The plate shaped battery 2e constructed in such a way has an effect similar to that of the plate shaped battery 2d shown in FIG. 17.

Seventeenth Embodiment

Figure 19:
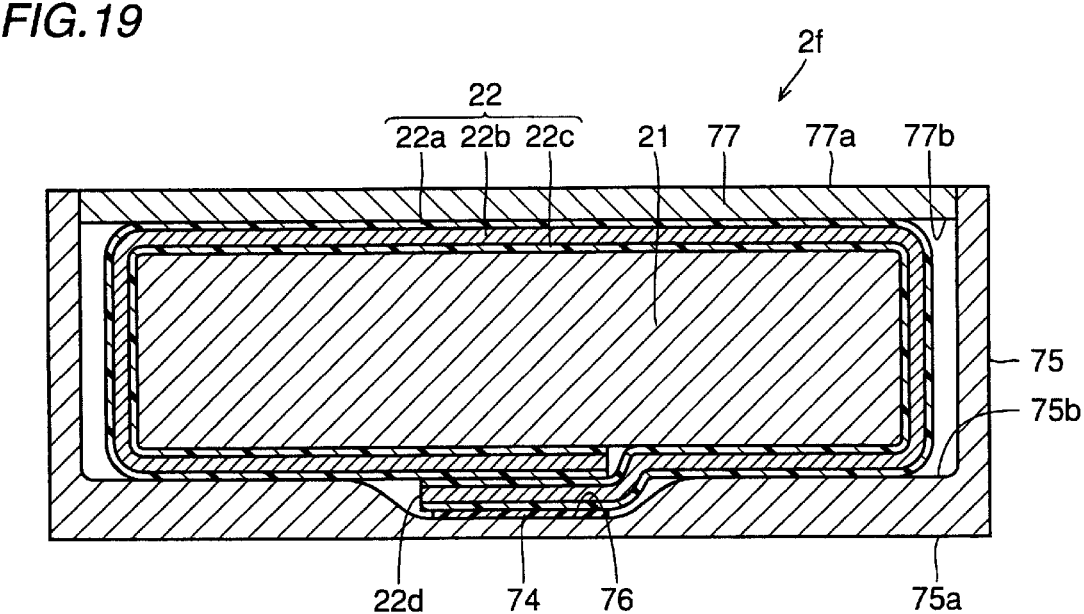
FIG. 19 is a sectional view of a plate shaped battery according to a seventeenth embodiment of the present invention.

Referring to FIG. 19, a plate shaped battery 2f according to the seventeenth embodiment of the present invention has a double-faced adhesive tape 74 to fix a laminated film 22 in a groove 76 of a lower case member 75. A seal portion 22d of the laminated film 22 is fittingly put into a groove 76 and fixed to the lower case member 75 by the double-faced adhesive tape 74. An inner surface 75b except the groove 76 of the lower case member 75 is in direct contact with the laminated film 22. An inner surface 77b of an upper case member 77 is also in direct contact with the laminated film 22. The other points of the plate shaped battery 2f shown in FIG. 19 are similar to corresponding points in construction of the plate shaped battery 2d shown in FIG. 17.

The plate shaped battery 2f constructed in such a way has an effect similar to that of the plate shaped battery 2d shown in FIG. 17. Moreover, since the inner surface 75b of the lower case member 75 is in direct contact with the laminated film 22 and an inner surface 77b of an upper case member 77 is also in direct contact with the laminated film 22, thereby enabling further downsizing of a portable telephone.

Eighteenth Embodiment

Figure 20:
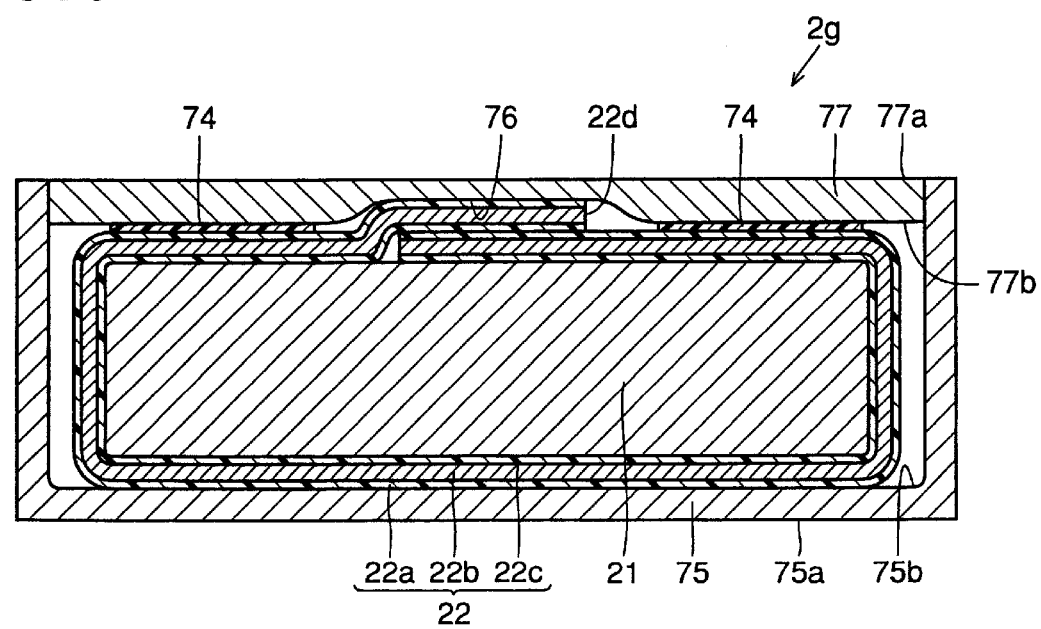
FIG. 20 is a sectional view of a plate shaped battery according to an eighteenth embodiment of the present invention.

Referring to FIG. 20, a plate shaped battery 2g according to the eighteenth embodiment of the present invention is different from the plate shaped batteries 2d to 2f shown in FIGS. 17 to 19, wherein the groove 76 is formed on the lower case member 76, in that a groove 76 is formed on ant upper case member 77. A double-faced adhesive tape 74 is attached to an inner surface 77b of the upper case member 77.

The double-faced adhesive tape 74 is in contact with the upper case member 77 and the laminated film 22 to fix the laminated film 22 to the upper case member 77. The groove 76 is in direct contact with the laminated film 22 constituting a seal portion 22d. An inner surface 75b of a lower case member 75 is in direct contact with the laminated film 22. The upper case member 77 may be located on the body side of a portable telephone and the lower case member 75 may be located on the cover side of the portable telephone. Moreover, contrary to this, the upper case member 77 may be located on the cover side of the portable telephone and the lower case member 75 may be located on the body side of the portable telephone.

The plate shaped battery 2g constructed in such a way has an effect similar to the plate shaped battery 2d shown in FIG. 17 according to the fifteenth embodiment.

Nineteenth Embodiment

Figure 21:
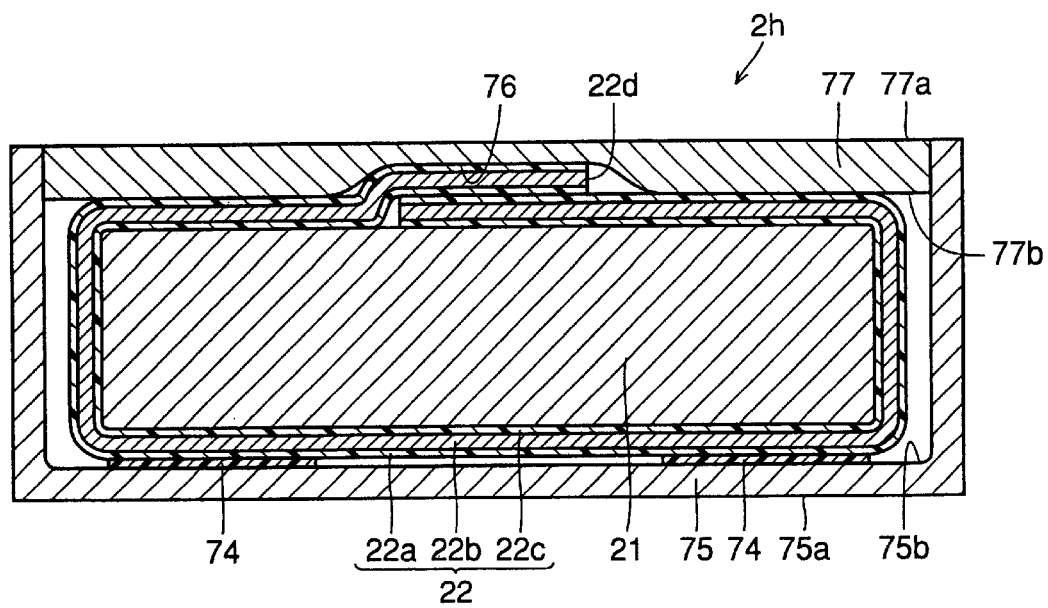
FIG. 21 is a sectional view of a plate shaped battery according to a nineteenth embodiment of the present invention.

Referring to FIG. 21, a plate shaped battery 2h according to the nineteenth embodiment of the present invention is different from the plate shaped battery 2g shown in FIG. 20 in that a double-faced adhesive tape 74 is attached to an inner surface 75b of a lower case member 75. The inner surface 75b of the lower case member 75 is directly in no contact with a laminated film 22, but in contact with the laminated film 22 through the double-faced adhesive tape 74 interposing therebetween. An inner surface 77b of an upper case member 77 is in direct contact with the laminated film 22. Moreover, the groove 76 is also in direct contact with the laminated film 22.

The plate shaped battery 2h constructed in such a way has an effect similar to that of the plate shaped battery 2g shown in FIG. 20.

Twentieth Embodiment

Figure 22:
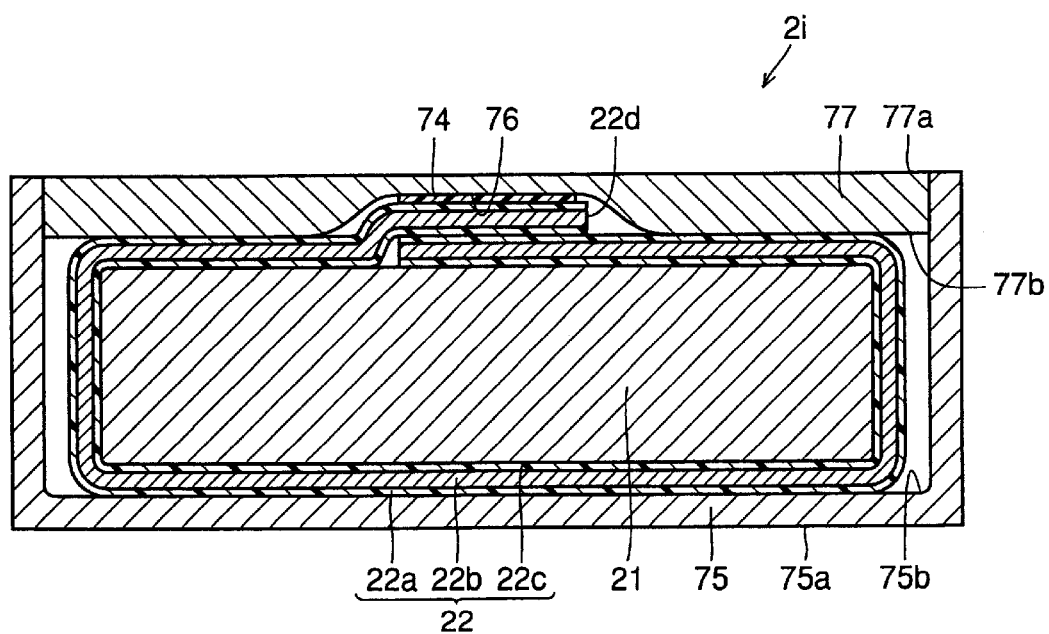
FIG. 22 is a sectional view of a plate shaped battery according to a twentieth embodiment of the present invention.

Referring to FIG. 22, a plate shaped battery 2i according to the twentieth embodiment of the present invention has a double-faced adhesive tape 74 provided in a groove 76 on an upper case member 77. The double-faced adhesive tape 74 fixes a laminated film 22 constituting a seal portion 22d to the upper case member 77. An inner surface of the groove 76 is in no direct contact with the laminated film 22, but in contact with the laminated film 22 with the double-faced adhesive tape 74 interposing therebetween. An inner surface 77b of the upper case member 77 is in direct contact with the laminated film 22 except a portion in which the groove 76 is formed. Moreover, an inner surface 75b of a lower case member 75 is in direct contact with the laminated film 22.

The plate shaped battery 2i constructed in such a way has an effect similar to that of the plate shaped battery 2f shown in FIG. 19.

Twenty-first Embodiment

Figure 23:
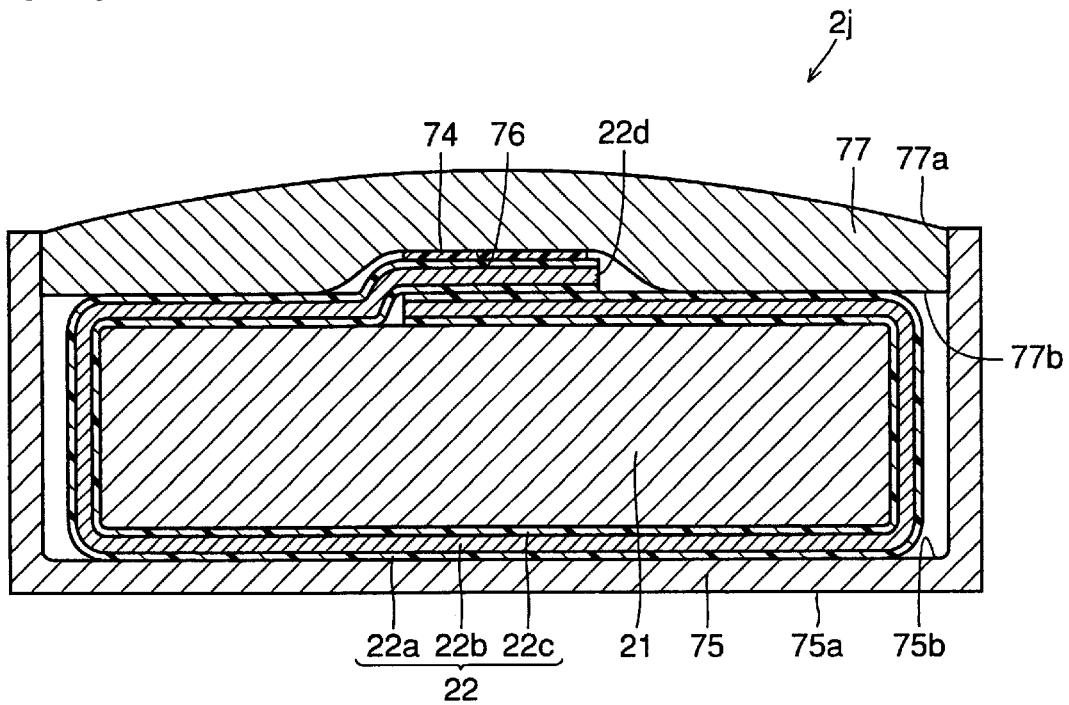
FIG. 23 is a sectional view of a plate shaped battery according to a twenty-first embodiment of the present invention.

Referring to FIG. 23, a plate shaped battery 2j according to the twentieth-first embodiment of the present invention is different from the plate shaped battery 2i in that an outer surface 77a of an upper case member 77 has a curvature and a sectional profile thereof is curved. The other points in construction of the plate shaped battery 2j shown in FIG. 23 are similar to corresponding points in construction of the plate shaped battery 2i shown in FIG. 22.

The plate shaped battery 2j constructed in such a way, firstly, has an effect similar to that of the plate shaped battery 2i shown in FIG. 22. Moreover, an outer surface 77a of an upper case member 77 is formed with a curved surface. Hence, when the upper case member 77 is used as the cover side of a portable telephone, a portion of the portable telephone which is grasped by a human hand is shaped so as to conform with a profile of the outer surface 77a and be of a smooth curved surface. Hence, the portable telephone becomes to be easier to be held by hand. Moreover, since the upper case member 77 has the outer surface 77a of a curved surface convex outward, a thickness of the upper case member 77 can be larger. As a result, a strength of the upper case member 77 can be greater and besides, a higher reliability plate shaped battery can be fabricated.

Note that while in the plate shaped battery, a double-faced adhesive tape 74 is provided in a groove 76, it may be provided on a surface except a portion of a groove 76 of the upper case member 77. Moreover, the double-faced adhesive tape 74 may be provided on an inner surface 75b of a lower case member 75 to fix a laminated film 22.

Twenty-second Embodiment

Figure 24:
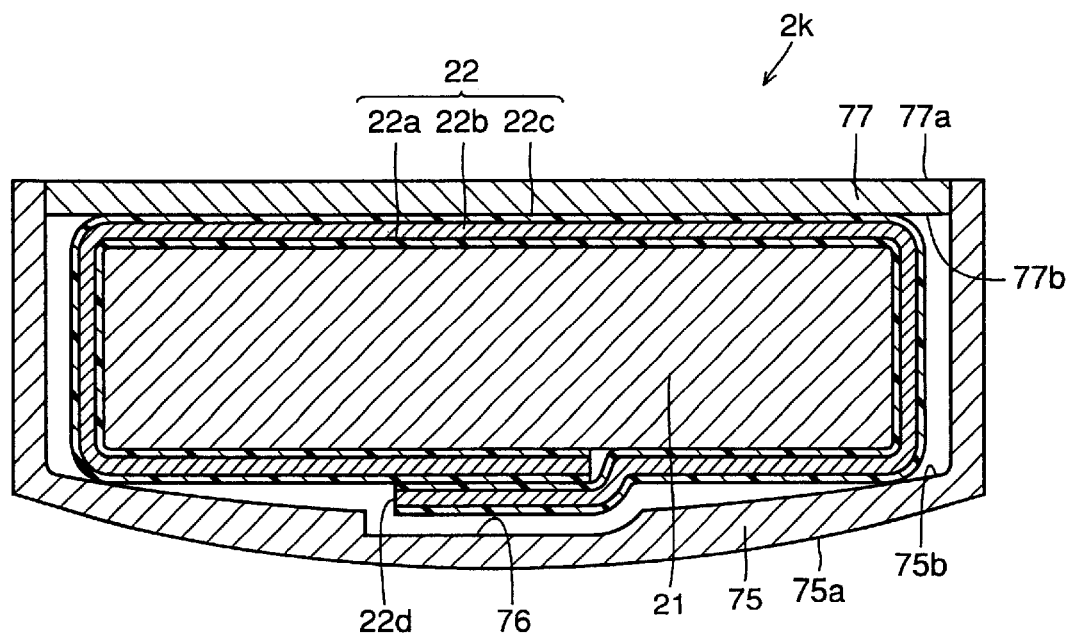
FIG. 24 is a sectional view of a plate shaped battery according to a twenty-second embodiment of the present invention.

Referring to FIG. 24, a plate shaped battery 2k according to the twenty-second embodiment of the present invention has an inner surface 75b of a lower case member 75 which surface has a curvature and is curved. Furthermore, an outer surface 75a of a lower case member 75 has a curvature and is curved. Besides, the plate shaped battery 2k is different from the plate shaped battery 2d according to the fifteenth embodiment shown in FIG. 17 in that no double-faced adhesive tape is provided.

An outer surface 75a of the lower case member 75 has a profile shaped so as to conform with the cover side of a portable telephone, that is the side which a man holds by hand. An inner surface 75b thereof has a profile in conformity with an expanded laminated film 22 when a battery core 21 wrapped by the laminated film 22 is heated and thereby the laminated film 22 expands. Therefore, a prescribed distance is spared between the laminated film 22 and the inner surface 75b and thereby the lower case member 75 has a margin of expansion so as not to be explosively broken even when the battery core 21 expands. Note that the double-faced adhesive tape may be interposed between the laminated film 22 and an upper case member 77.

The plate shaped battery 2k constructed in such a way, firstly, has an effect similar to that of the plate shaped battery 2d shown in FIG. 17 according to the fifteenth embodiment. Moreover, even when the battery core 21 rapidly generates heat to expand the laminated film 22, a prescribed space is spared between the laminated film 22 and the lower case member 75; therefore, there is no chance that the lower case member 75 is explosively broken. As a result, a higher level of safety can be assured.

In addition, the outer surface 75a is shaped so as to fit a human hand when grasping; therefore, a plate shaped battery can be adapted to be held by hand with more of ease.

Twenty-third Embodiment

Figure 25:
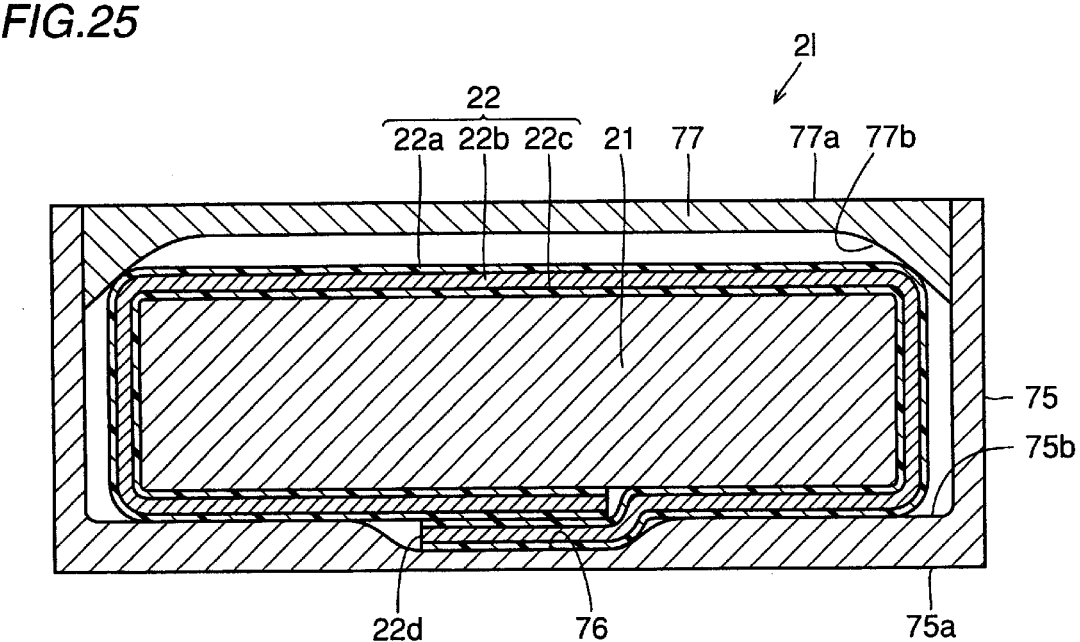
FIG. 25 is a sectional view of a plate shaped battery according to a twenty-third embodiment of the present invention.

Referring to FIG. 25, a plate shaped battery 2l according to the twenty-third embodiment of the present invention is different from the plate shaped battery 2i shown in FIG. 24 in which a space for preventing explosive breakage is provided between the lower case member 75 and the laminated film 22 in that a space for preventing explosive breakage is provided between an upper case member 77 and a laminated film 22.

An inner surface 77b of the upper case member 77 is formed so as to be curved with a curvature. Part of the laminated film 22 is in contact with the upper case member 77. The inner surface 77b of the upper case member 77 is a curved surface in which a curvature of a middle portion is smaller but a curvature increases toward both ends of the inner surface 77b. A profile of the inner surface 77b of the upper case member 77 is shaped so as to conform with a profile of an expanded laminated film 22 when a battery core 21 rapidly generates heat and the laminated film 22 expands.

An inner surface 75b of a lower case member 75 and the laminated film 22 are in direct contact with each other. A seal portion 22d is fittingly put in a groove 76 of the lower case member 75. The seal portion 22d is in direct contact with an inner surface of the groove 76. A double-faced adhesive tape or an adhesive may be interposed between the inner surface 75b of the lower case member 75 and the laminated film 22. Furthermore, the double-faced adhesive tape or the adhesive may be interposed between the inner surface of the groove 76 and the laminated film 22 constituting a seal portion 22d. Besides, an outer surface 77a of the upper case member 77 may be of a curved surface convex outward with a curvature.

The plate shaped battery 2l constructed in such a way, firstly, has an effect similar to the plate shaped battery 2k shown in FIG. 24.

Twenty-fourth Embodiment

Figure 26:
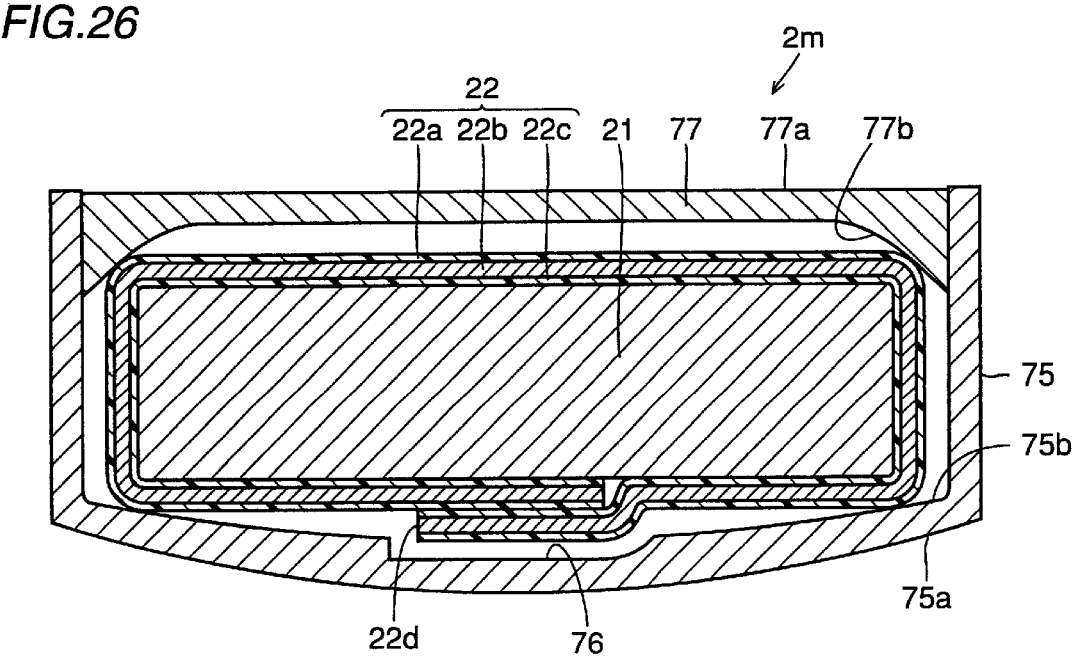
FIG. 26 is a sectional view of a plate shaped battery according to a twenty-fourth embodiment of the present invention.

Referring to FIG. 26, a plate shaped battery 2m according to the twenty-fourth embodiment of the present invention is different from the plate shaped batteries 2k and 2l shown in FIGS. 24 and 25 in that a space for preventing explosive breakage is provided between each of an upper case member 77 and a lower case member 75, and a laminated film 22.

An outer surface 75a of the lower case member 75 is curved with a curvature. Besides, an inner surface 75b is also curved with a curvature. The outer surface 75a is shaped so as to conform with the cover side of a portable telephone, that is a portion which a man holds by hand. The inner surface 75b is shaped so as to conform with a profile of the expanded laminated film 22 when a battery core 21 generates heat and the laminated film 22 expands.

An inner surface 77b of the upper case member 77 is of a curved surface with a curvature. A profile of the inner surface 77b is the same as that of the expanded laminated film 22. Furthermore, an outer surface 77a is a flat surface with no curvature but may be of a curved surface convex outward with a curvature similar to the outer surface 75a of the lower case member 75.

The plate shaped battery 2m constructed in such a way, firstly, has an effect similar to that of the plate shaped battery 2k shown in FIG. 24. Moreover, since the inner surface 77b of the upper case member 77 and the inner surface 75b of the lower case member 75 each are shaped so as to conform with a profile of the expanded laminated film 22, there is no chance that the upper case member 77 and the power case member 75 are explosively broken. Consequently, a higher level of safety can be attained.

Twenty-fifth Embodiment

Figure 27A:
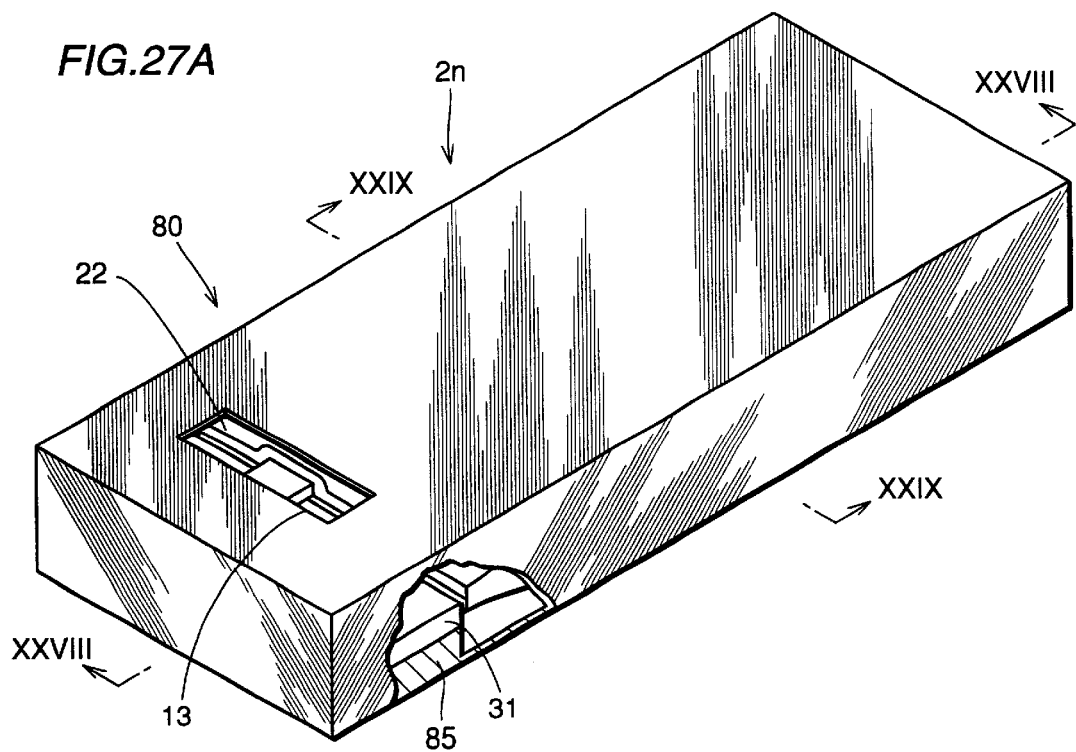
FIG. 27A is a perspective view including a partial section of a plate shaped battery according to a twenty-fifth embodiment of the present invention.

Referring to FIG. 27A, a plate shaped battery 2n according to the twenty-fifth embodiment of the present invention has a case 80. The case 80 is a rectangular parallelepiped having six faces. The case 80 is made from an aluminum alloy. A case window 13 is formed on one of the largest faces. A laminated film 22 wrapping the plate shaped battery 2n is seen through the case window 13. A protruding portion 85 is provided at the bottom of the case 80. A printed board 31 is placed on the protruding portion 85.

Figure 27B:
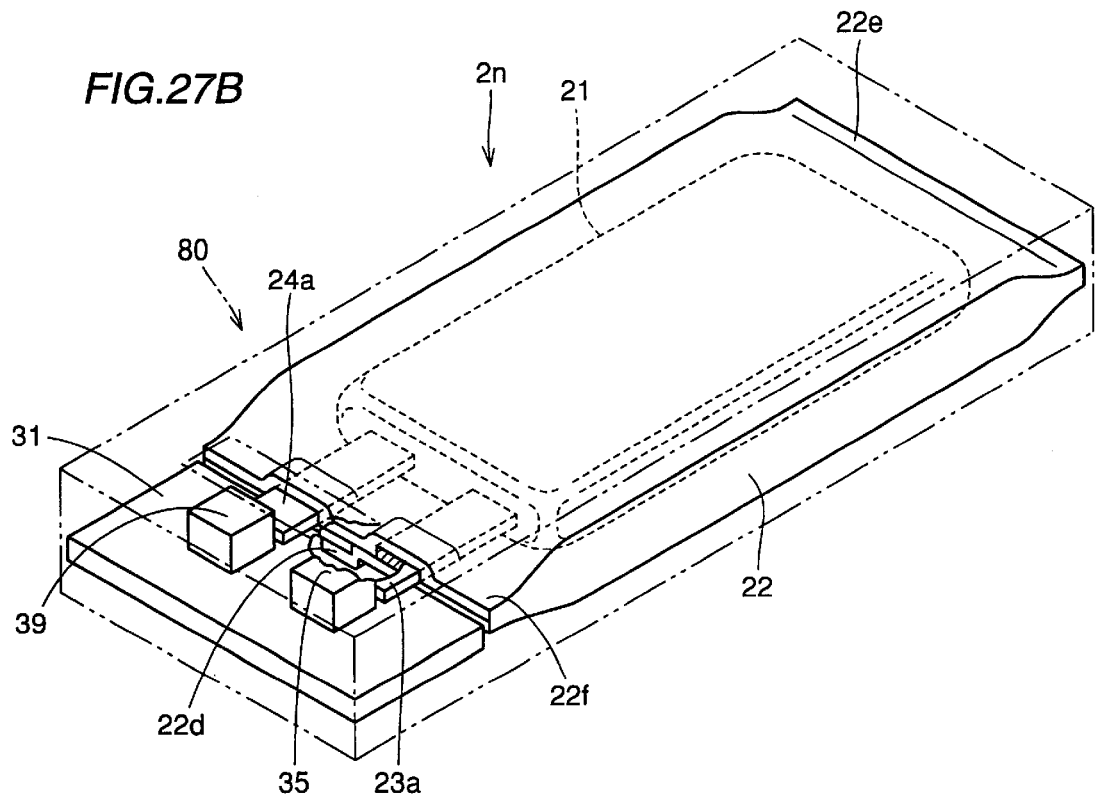
FIG. 27B is a perspective view showing an internal construction of a plate shaped battery according to the twenty-fifth embodiment of the present invention.

Referring to FIG. 27B, the plate shaped battery 2n according to the twenty-fifth embodiment of the present invention includes: a battery core 21; a laminated film wrapping the battery core 21; cathode terminals 23a and 25, and anode terminals 24a and 39 electrically connected to the battery core 21; and the case 80 surrounding all of the above described constituents.

The plate shaped battery 2n shown in FIG. 27B is different from the plate shaped battery 1a shown in FIG. 1B in that a substance of the case 80 is an aluminum alloy, a seal portion 22d is disposed under the battery core 21 and a groove receiving the seal portion 22d (not shown in FIG. 27B) is on the case 80. The other points in construction of the plate shaped battery 2n shown in FIG. 27B is the same as corresponding points in construction of the plate shaped battery 1a shown in FIG. 1B.

Figure 28:
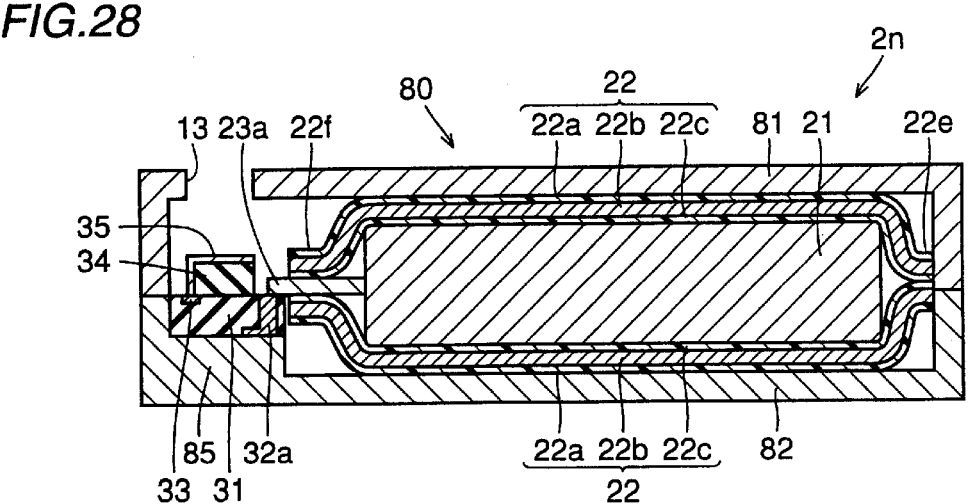
FIG. 28 is a sectional view taken on line XXVIII—XXVIII of FIG. 27A.

Referring to FIG. 28, the plate shaped battery 2n is different from the plate shaped battery 1a shown in FIG. 2 in that an upper case member 81 and a lower case member 82, and the protruding portion 85 are all made from an aluminum alloy, an upper case member 81 and a resin layer 22a of the laminated film 22 are in contact with each other and a cathode terminal 32a is electrically connected to the protruding portion 85 of the lower case member 82.

Figure 29:
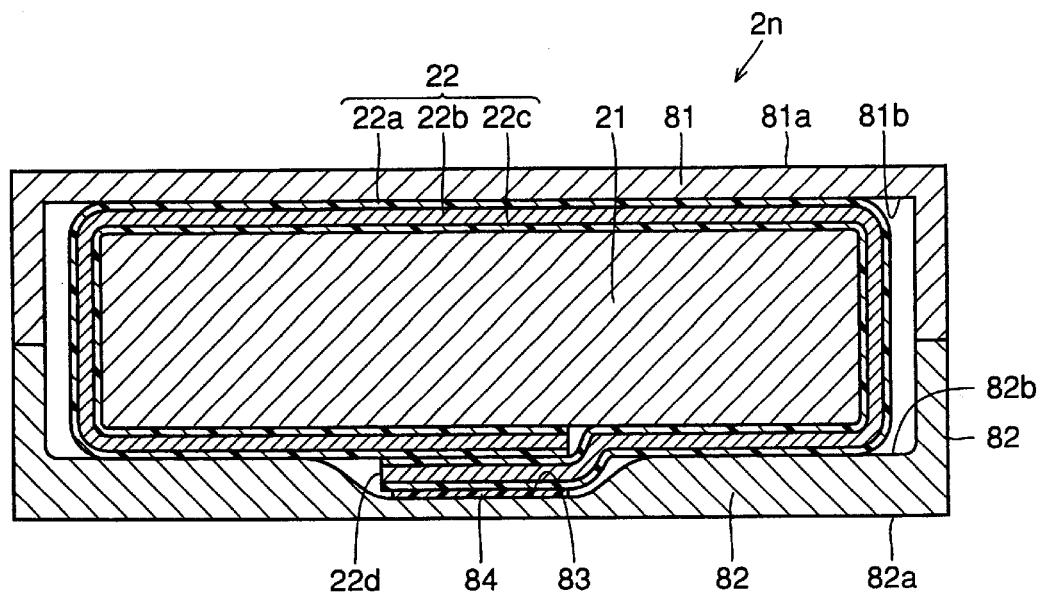
FIG. 29 is a sectional view taken on line XXIX—XXIX of FIG. 27A.

Referring to FIG. 29, the plate shaped battery 2n includes: the battery core 21; the laminated film 22 wrapping the battery core 21; and the upper and lower case members 81 and 82 surrounding both of the above described constituents. The upper and lower case members 81 and 82 are in direct contact with each other and the upper case member 81 is fixed to the lower case member 82. The battery core 21 wrapped with the laminated film 22 is positioned in a space surrounded by the upper and lower case members 81 and 82. A seal portion 22d formed by both ends overlapping with each other of the laminated film 22 is fittingly put in a groove 83 of the lower case member 82. Note that the groove 83 is formed so as to extend from the front side of the sheet on which the figure is shown to the rear side thereof and a double-faced adhesive tape 84 is also provided along and in the groove 83. An inner surface of the groove 83 and the laminated film 22 constituting the seal portion 22d are fixed by a double-faced adhesive tape 84. The inner surface of the groove 83 and a surface of the laminated film 22 are not in direct contact with each other but in contact with the double-faced adhesive tape 84 interposed therebetween. An inner surface 82b of the lower case member 82 is almost a flat surface with no curvature except a portion in which the groove 83 is formed and in direct contact with the laminated film 22. An outer surface 82a of the lower case member 82 is almost a flat surface with no curvature. Outer and inner surfaces 81a and 81b of the upper case member 81 are flat surfaces with no curvature. The outer surfaces 81a and 82a, and the inner surfaces 81b and 82b may be curved surfaces convex outward with a curvature. Furthermore, the double-faced adhesive tape 84 may be provided on the inner surface 82b except the groove 83 of the lower case member 82 or the inner surface 81b of the upper case member 81.

Since in the plate shaped battery constructed in such a way, firstly, a cathode terminal 35 is supported by the protruding portion 15 similar to the plate shaped battery 1a shown in FIGS. 1A, 1B, and 2, there arises no chance that even when the cathode terminal 35 and a contact pin of a portable telephone are put into contact with each other, the cathode terminal 35 is displaced. Consequently, electrical contact therebetween can be ensured, which leads to a high reliability plate shaped battery.

Furthermore, since the upper and lower case members 81 and 82 are made from a conductive substance and thereby, potentials thereof are kept constant (the same potential as that of a cathode terminal 23a), the upper and lower case members 81 and 82 exert an electromagnetic shield effect on the battery core 21. Consequently, a high frequency current flowing in a circuit of the body of a portable telephone is not modulated, whereby a higher reliability plate shaped battery can be obtained.

Furthermore, the groove 84 for fittingly receiving the seal portion 22d is, as shown in FIG. 29, formed on the lower case member 82. With such a construction adopted, not only can the laminated film 22 be surly positioned, but the plate shaped battery 2n can also be downsized.

Various modifications or alterations of the above described embodiments are possibility. Firstly, structures of an anode terminal and a cathode terminal are shown such that the terminals are placed on the terminal rest as shown in FIG. 2, or one cathode terminal and one anode terminal are placed directly on the other cathode terminal and the other anode terminal, respectively. The two structures can be applied to all the other embodiments.

Moreover, as protruding portions, shown are the relatively low protruding portion 15 as shown in FIG. 2 and the relative high protruding portion 17 as shown in FIG. 3. The two kinds of protruding portions can be applied to all the other embodiments.

Furthermore, while in the fourth embodiment, the protruding portion is constituted of the temperature detector 42 as shown in FIG. 5 and the metal plate 41 is provided beneath the temperature detector 42, the structure can be applied to all the other embodiments.

Besides, while in FIG. 12 of the eleventh embodiment, shown is the portable telephone 100 using the plate shaped battery 1a, the plate shaped batteries 1b to 1j and 2a to 2n in the other embodiments can be mounted in a portable telephone.

Moreover, while a portable telephone is shown as a portable radio terminal in the embodiments, a plate shaped battery of the present invention may be mounted on a note book PC as a portable radio terminal.

Furthermore, while the cases in each of which a plate shaped battery is a lithium battery are described above, there is no limitation to the lithium battery but the present invention may be applied to a nickel-cadmium battery, for example. Herein, any of a primary battery and a secondary battery may be adopted.

Besides, while the double-faced adhesive tape is adopted as means connecting a laminated film to the upper case member or the lower case member, but there is no specific limitation to the tape, but an adhesive may be adopted instead.

Moreover, the laminated film 22 may be partly molten to bond the upper case and lower case members with each other.

Besides, as substances of a case, iron, titanium, copper and so on can be used and plating such as gold plating may be performed on an electrode terminal.

INDUSTRIAL APPLICABILITY

A plate shaped battery of the present invention can be used in a portable telephone, a portable PC having a communication capability, or further, other ordinary radio equipments.

What is claimed is:

1. A plate shaped battery comprising:
    an anode terminal and a cathode terminal connected to a power generating element generating power and extend from almost a middle portion of said power generating element to the outside thereof;
    a wrapping member sealing said power generating element and formed in the shape of a wrapper; and
    a support member supporting said anode terminal or said cathode terminal extending outward from said power generating element; and
    wherein said support member includes a temperature detector.

2. The plate shaped battery according to claim 1, further comprising a heat transfer member connecting said wrapping member and said temperature detector therebetween in order to transfer heat from said power generating element to said temperature detector.

3. The plate shaped battery according to claim 1, wherein said support member is formed on a surface of an exterior member in one body therewith.

4. The plate shaped battery according to claim 1, further comprising a conductive exterior member surrounding said wrapping member.

5. The plate shaped battery according to claim 4, wherein said exterior member is electrically connected to one of said anode terminal and said cathode terminal.

6. A portable radio terminal using a plate shaped battery according to claim 1.

* * * * *

UNITED STATES PATENT AND TRADEMARK OFFICE
CERTIFICATE OF CORRECTION

PATENT NO.    : 6,844,105 B1
DATED         : January 18, 2005
INVENTOR(S)   : Hanafusa et al.

It is certified that error appears in the above-identified patent and that said Letters Patent is hereby corrected as shown below:

<u>Title page,</u>
Item [86], PCT No.:, "PCT/JP00/07132" should read -- PCT/JP99/07132 --

Signed and Sealed this

Twenty-first Day of June, 2005

JON W. DUDAS
*Director of the United States Patent and Trademark Office*